(12) United States Patent
Riddering et al.

(10) Patent No.: US 7,068,457 B2
(45) Date of Patent: Jun. 27, 2006

(54) SYSTEM AND METHOD FOR ELECTROSTATIC FLY HEIGHT CONTROL

(75) Inventors: Jason Wayne Riddering, Prior Lake, MN (US); Wayne Allen Bonin, North Oaks, MN (US); Lance Eugene Stover, Eden Prairie, MN (US); Zine-Eddine Boutaghou, Vandais Heights, MN (US); Daniel Paul Burbank, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 223 days.

(21) Appl. No.: 10/224,820

(22) Filed: Aug. 21, 2002

(65) Prior Publication Data

US 2003/0043497 A1    Mar. 6, 2003

Related U.S. Application Data

(60) Provisional application No. 60/371,224, filed on Apr. 9, 2002, provisional application No. 60/332,236, filed on Nov. 16, 2001, provisional application No. 60/314,521, filed on Aug. 22, 2001.

(51) Int. Cl.
  *G11B 21/02* (2006.01)
(52) U.S. Cl. .................................................. 360/75
(58) Field of Classification Search ............... 360/75, 360/25, 69, 26, 64, 70, 74.7, 234.7
  See application file for complete search history.

(56) References Cited

U.S. PATENT DOCUMENTS

| | | | |
|---|---|---|---|
| 4,605,977 A * | 8/1986 | Matthews | 360/234.7 |
| 4,669,011 A | 5/1987 | Lemke | 360/103 |
| 4,853,810 A * | 8/1989 | Pohl et al. | 360/234.7 |
| 5,153,785 A | 10/1992 | Muranushi et al. | 360/75 |
| 5,699,212 A | 12/1997 | Erpelding et al. | 360/104 |
| 5,764,432 A | 6/1998 | Kasahara | 360/75 |
| 6,005,736 A * | 12/1999 | Schreck | 360/75 |
| 6,181,531 B1 | 1/2001 | Koshikawa et al. | 360/294.4 |
| 6,196,062 B1 | 3/2001 | Wright et al. | 73/105 |
| 6,359,746 B1 * | 3/2002 | Kakekado et al. | 360/75 |
| 6,366,416 B1 * | 4/2002 | Meyer et al. | 360/25 |
| 6,529,342 B1 * | 3/2003 | Feng et al. | 360/75 |
| 6,577,466 B1 * | 6/2003 | Meyer et al. | 360/75 |
| 6,700,724 B1 * | 3/2004 | Riddering et al. | 360/69 |

OTHER PUBLICATIONS

U.S. Appl. No. 10/140,801, filed May 7, 2002, entitled "Slider Deposits Control of Pole-to-Pole Spacing".

(Continued)

*Primary Examiner*—William Klimowicz
*Assistant Examiner*—Fred F. Tzeng
(74) *Attorney, Agent, or Firm*—Todd R. Fronek; Westman, Champlin & Kelly

(57) ABSTRACT

A head for use in accessing data from an electrically conductive media surface is provided. The head has a slider body defining a bearing plane configured to face the media surface. A fly height control electrode is positioned on the raised portion. Further, the fly height control electrode and the media surface are adapted to form opposing plates of a capacitor with a dielectric layer of air supporting the head. Also, the fly height control electrode is electrically isolated from the slider body. A head electrical connection disposed on the slider body is electrically connected to the fly height control electrode. The head electrical connection is adapted to provide a fly height control voltage to the fly height control electrode.

30 Claims, 30 Drawing Sheets

OTHER PUBLICATIONS

U.S. Appl. No. 10/055,448, filed Jan. 23, 2002, entitled "Integrated Electrostatic Slider Fly Height Control".

U.S Appl. No. 09/845,619, filed Apr. 30, 2001, entitled "Thermal Compensation for Head Protrusion in a Magnetic Drive".

* cited by examiner

SYSTEM AND METHOD FOR ELECTROSTATIC FLY HEIGHT CONTROL

CROSS-REFERENCE TO RELATED APPLICATION

This application claims benefit of U.S. Provisional Application 60/314,521 titled "Contact Detection and Calibration for Electrostatic Fly Height Control in Disc Drive," filed Aug. 22, 2001, U.S. Provisional Application 60/332,236 titled "Dedicated Electrodes for Electrostatic Fly Height Control," filed Nov. 16, 2001 and U.S. Provisional Application 60/371,224 titled "Dedicated Electrode Concepts for Electrostatic Fly Height Control," filed Apr. 9, 2002.

FIELD OF THE INVENTION

The present invention relates generally to magnetic data storage drives. In particular, this invention relates to methods and structures for fly height control.

BACKGROUND OF THE INVENTION

As the areal density in newer disc drive designs increases, the magnetic spacing and fly height between the pole tips of the read/write heads and the magnetic storage media becomes correspondingly smaller. With these extremely small fly heights, manufacturing variations in the disc topography, particularly during seeking operations, can result in undesired transient mechanical contact between the head and the disc.

To reduce instances of undesired contact, there is a desire to use electrostatic type actuators in fly height control arrangements because of their low cost, low mass and low power consumption. Electrostatic actuators, however, generate an attractive force between the head and the disc that has an approximately inverse square relationship to the spacing. As the head moves closer to the disc, the attractive force increases exponentially. The electrostatic force can force the head to crash into the disc, resulting in damage to the head, the disc, or both. When the head is very close to the disc and the electrostatic actuator is used, the control of the fly height becomes unstable.

A method and an apparatus are needed to reduce the damage to heads or discs when a disc drive includes an electrostatic actuator controlling fly height spacing and the head contacts the disc.

SUMMARY OF THE INVENTION

The present invention relates to systems that address the above-mentioned problems. In one embodiment, a head for use in accessing data from an electrically conductive media surface is provided. The head includes a slider body defining a bearing plane configured to face the media surface. A fly height control electrode is positioned on the slider body and electrically isolated from the slider body. The fly height control electrode and the media surface are adapted to form opposing plates of a capacitor with a dielectric layer of air supporting the head. A head electrical connection is disposed on the slider body and electrically connected to the fly height control electrode. The head electrical connection is adapted to provide a fly height control voltage to the fly height control electrode.

In another embodiment, a method is provided for forming a head slider. The method includes providing a slider body. Additionally, a fly height control electrode is electrically isolated from the slider body. Furthermore, a head electrical connection is connected to the fly height control electrode and adapted to apply a fly height control voltage to the fly height control electrode.

These and various other features as well as advantages that characterize the present invention will be apparent upon reading of the following detailed description and review of the associated drawings.

DETAILED DESCRIPTION OF ILLUSTRATIVE EMBODIMENTS

Embodiments of the present invention are useful in accessing data from a media surface. Accessing includes reading and/or writing data to a media surface. In the disc drive embodiments discussed below, fly height spacing between a head and a disc is controlled using a control signal voltage that electrostatically adjusts the fly height spacing to maintain fly height at a desired set point. When the spacing is extremely close, however, the control provided by the control circuit is unstable and the read/write head can be drawn into undesired contact with the disc by electrostatic attraction. The head includes an air-bearing surface and a dedicated fly height control electrode electrically isolated from the slider body. In one embodiment, a portion of the slider body provides a mechanical spacing between the electrode and the disc so that the electrode does not contact the disc. Furthermore, an electrostatic force between the electrode and the disc can be kept below certain levels to reduce head/disc contact. Consequently, damage to the disc and head is reduced and reliability is improved.

As the areal density in newer disc drive designs increases, the magnetic spacing between the pole tips of the read/write heads and the magnetic storage media becomes correspondingly smaller. Coatings and lubricants use up a portion of this magnetic spacing. A portion of this magnetic spacing is also used up by an allowance for pole tip recession (PTR) and thermal pole tip recession (T-PTR), which reduces magnetic spacing at higher temperatures. After these features use up portions of the magnetic spacing, only an extremely small mechanical spacing, or fly height, is left for an air bearing layer between the read/write head and the disc. With these extremely small fly heights, manufacturing variations from the head build or in the disc topography, particularly during seeking operations, or during mechanical shock from the disc drive environment can result in undesired transient mechanical contact between the head and the disc. To reduce instances of undesired mechanical contact, an electrostatic actuator is used to actively adjust the fly height. Using feedback, a relatively constant fly height spacing is maintained with a reduced number of instances of mechanical contact.

Electrostatic type actuators are useful in such feedback arrangements because of their low cost, low mass and low power consumption. Electrostatic actuators, however, generate an attractive force between the head and the disc that has an approximately inverse square relationship to the spacing. As the head moves closer to the disc, the attractive force increases exponentially. The electrostatic force can force the head to crash into the disc, resulting in damage to the head, the disc, or both. When the head is very close to the disc, the control of the fly height becomes unstable with an electrostatic type of actuator.

Figure 1:
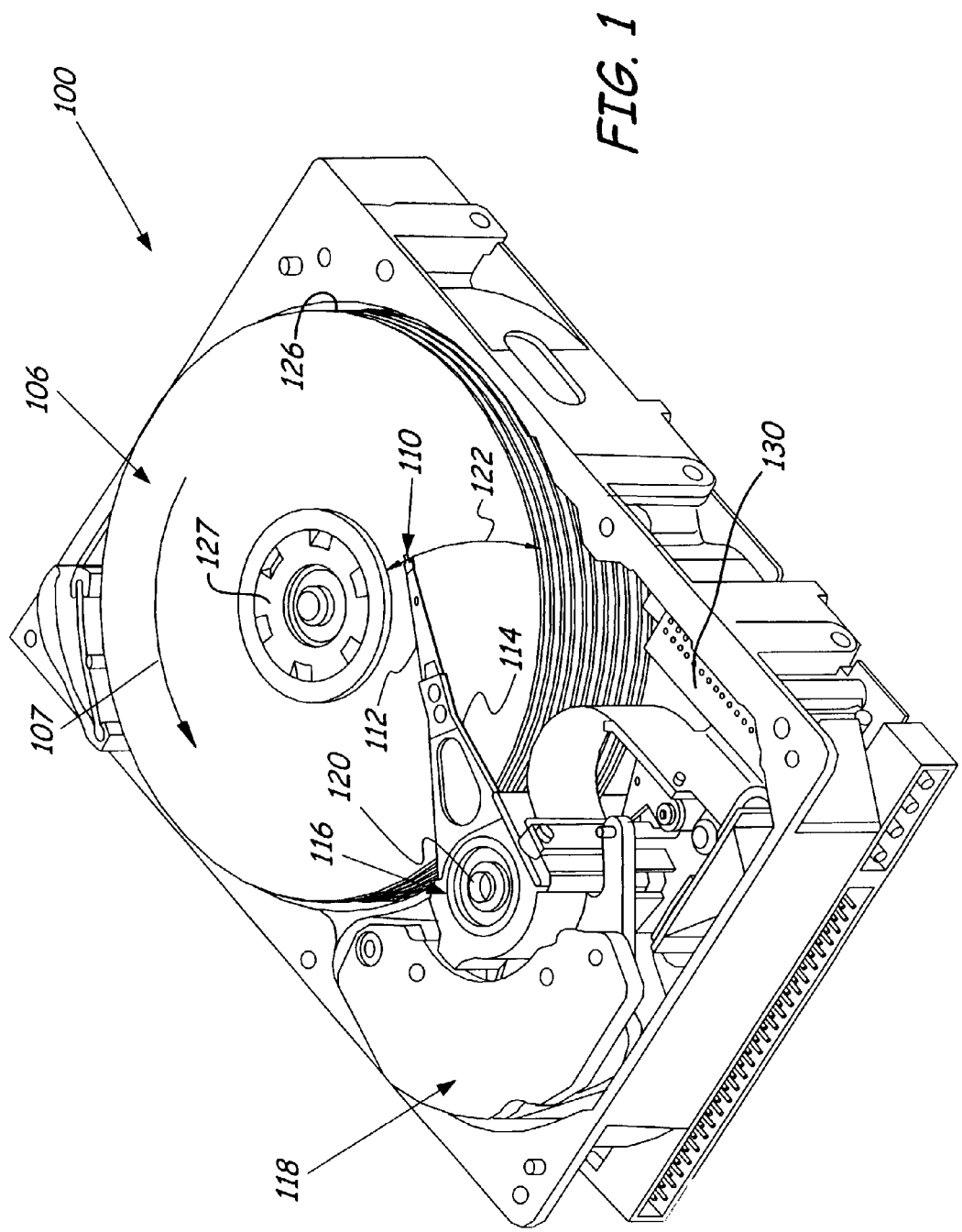
FIG. 1 illustrates a disc drive.

FIG. 1 illustrates an embodiment of a disc drive storage device 100. Disc drive 100 includes a disc pack 126 having storage surfaces 106 that are illustratively layers of material (such as magnetic material or optically readable material). The disc pack 126 includes a stack of multiple discs each accessible by a read/write head 110, also called a slider. Each read/write head 110 is supported by suspension assembly 112 and flies over a disc at a fly height that is actively controlled as explained in more detail below. A spindle motor 127 drives rotation of the discs in disc pack 126 in a direction such as that shown by arrow 107. As discs are rotated, read/write head 110 accesses different rotational locations on the storage surfaces 106 in disc pack 126. Read/write head 110 is actuated for radial movement relative to the disc surfaces 106, such as in a direction indicated by arrow 122, in order to access different tracks (or radial positions) on the disc surfaces 106. Such actuation of read/write head 110 is illustratively provided by a servo system that includes a voice coil motor (VCM) 118. Voice coil motor 118 includes a rotor 116 that pivots on axis 120. VCM 118 also illustratively includes an arm 114 that supports the suspension assembly 112. Disc drive 100 illustratively includes control circuitry 130 for controlling operation of disc drive 100 and for transferring data in and out of the disc drive 100.

In extremely low fly height disc drives, the air bearing by itself cannot maintain proper clearance with the disc. This is due to the fact that the mean losses from disc glide avalanche, carbon overcoats (e.g. C60, ALD), pole tip recession, and lube leave insufficient space for fly height variation. This is explained in more detail below in connection with FIGS. 2 and 3.

Figure 2:
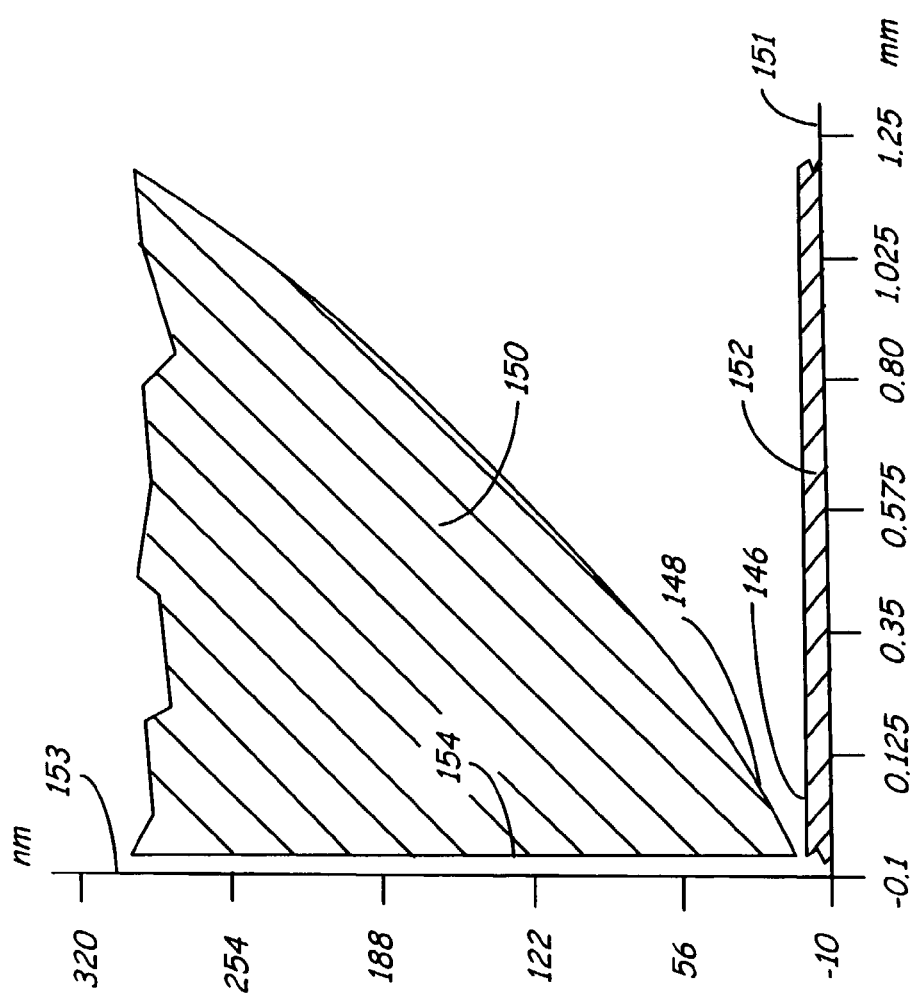
FIG. 2 illustrates a portion of a head flying over a disc.
Figure 3:
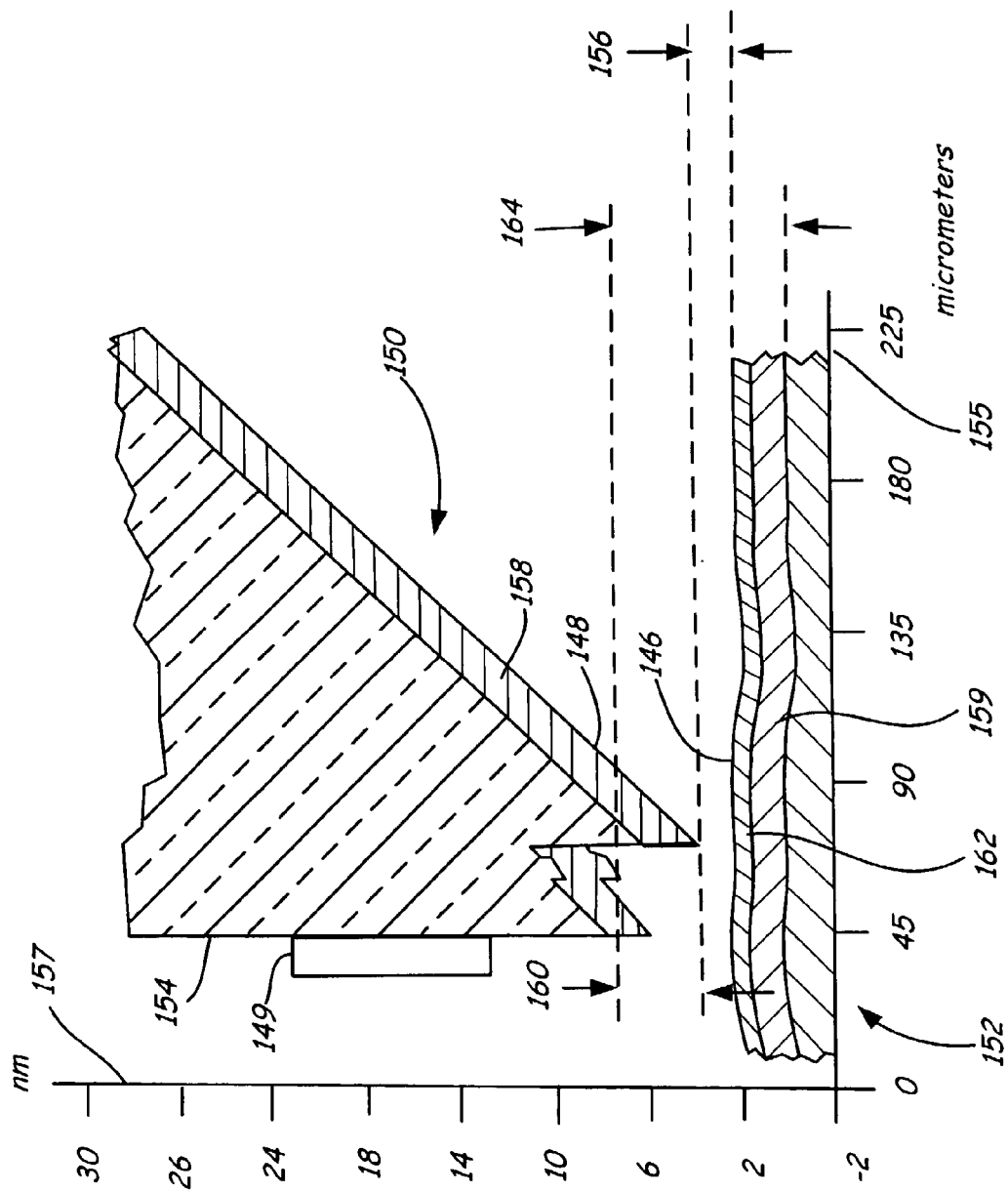
FIG. 3 illustrates an enlarged view of the arrangement in FIG. 2.

FIGS. 2–3 illustrate a portion of a head 150 flying over a disc 152. The arrangement shown in FIG. 2 is enlarged by different horizontal and vertical scale factors. A horizontal scale 151 shows horizontal distances in millimeters. A vertical scale 153 shows vertical distances in nanometers. FIG. 3 is a further enlarged view of the arrangement in FIG. 2, showing more detail near a trailing edge 154 of the slider. The arrangement shown in FIG. 3 is enlarged by different horizontal and vertical scale factors. A horizontal scale 155 shows horizontal distances in micrometers. A vertical scale 157 shows vertical distances in 5 nanometers.

At an extremely low fly height 156, diamond-like carbon coatings 158, 159, pole tip recession 160, and lubrication layer 162 take up a significant portion of the magnetic spacing 164. As illustrated in FIG. 3, the magnetic spacing 164 is about 7 nm, but the mechanical spacing or fly height 156 is only about 2 nm. The fly height 156 is the minimum spacing between the air bearing surface 148 and the top surface 146 of the lubrication layer 162. For test purposes, an acoustic emission (AE) sensor 149 can be deposited on the trailing edge 154 and connected to circuitry (not illustrated) that provides an acoustic emission sensor output that indicates when the head contacts the disc. Additional variation of fly height 156 can come from manufacturing variation, thermal pole tip protrusion, drive environment, or dynamic fly height losses due to disc topography or seeking. To compensate for these variations, an electrostatic actuator is included in the disc drive as explained in more detail below in connection with FIGS. 4–5.

Figure 4:
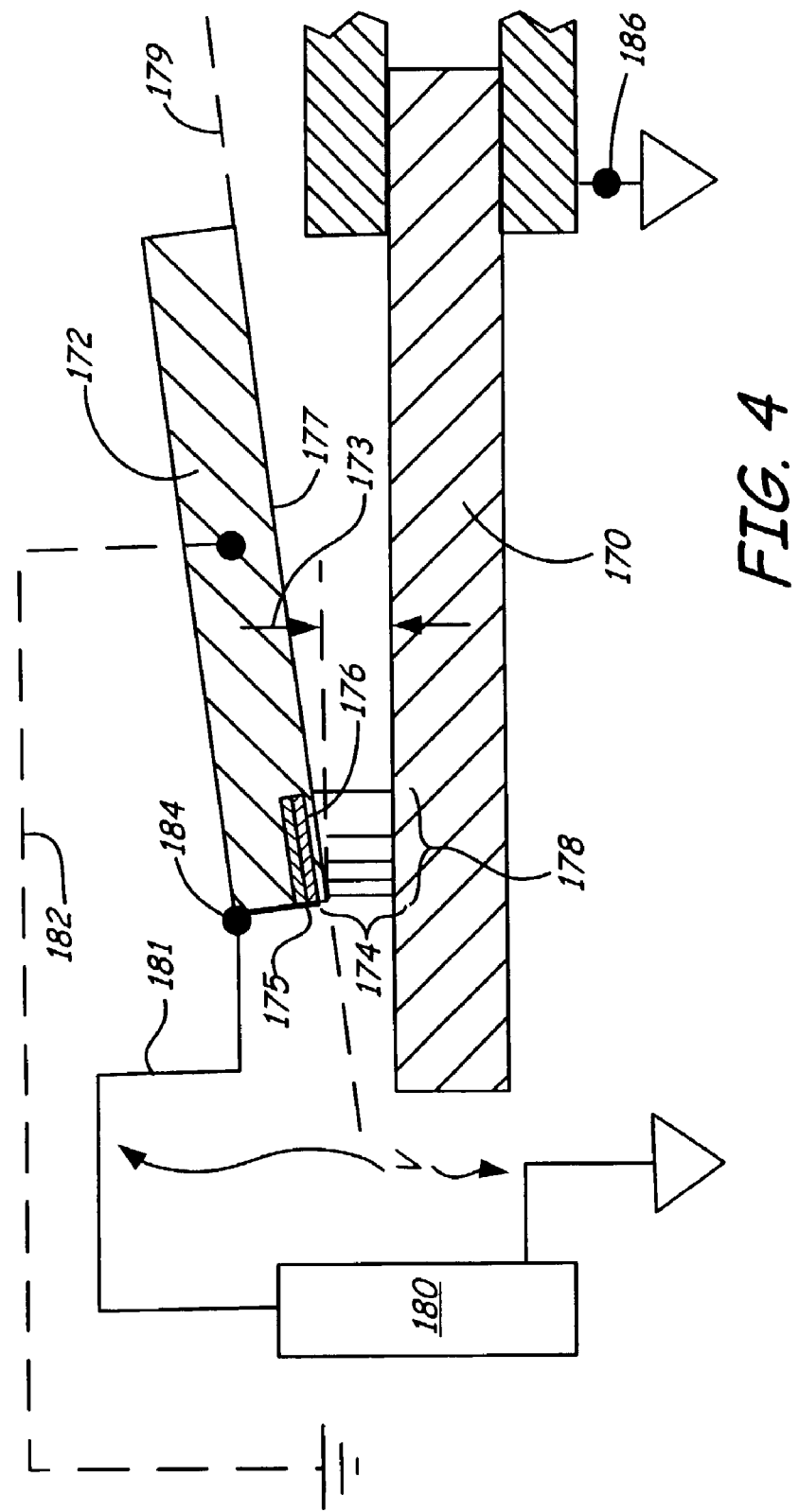
FIG. 4 illustrates a disc, a head and a fly height controller.

FIG. 4 illustrates a disc 170 and a head 172 carried above disc 170, separated by fly height spacing 173. In this embodiment, a dielectric layer of air supports the head 172 above disc 170. The disc 170 and head 172 include an electrostatic fly height actuator 174. The "electrostatic fly height actuator" 174 can be effectively formed by providing electrical connections 184, 186 on the conventional disc and head structures so that the control signal V (i.e. a fly height control voltage) can be connected. The disc 170 can be connected at a disc electrical connection 186 to a common conductor as shown. Stray electrical paths from the head 172 to the common conductor are eliminated so that a portion of the head 172 can be charged relative to the disc 170. The head 172 has a head electrical connection 184 that connects to a fly height controller 180.

The electrostatic fly height actuator 174 comprises a first actuator electrode 176 illustratively recessed from air bearing surface 177 (which is coplanar with bearing surface plane 179) and the disc 170, which acts as a second actuator electrode 178 with an effective area equal to that of first actuator electrode 176. First actuator electrode 176 is a fly height control electrode adapted to be attracted to second actuator electrode 178 in order to control fly height of the head 172. Generally, the disc 170 is an electrically conductive media surface. The bearing surface plane 179 is positioned between the first actuator electrode 176 and the disc 170, which forms second actuator electrode 178. The second actuator electrode 178 has a shape that is defined by the facing shape of the first actuator electrode 176 that overlies it. The first electrode 176 acts as a first capacitor plate, and the second electrode 178 that faces the first capacitor plate acts as a second capacitor plate. The two capacitor plates are separated by a dielectric layer (herein an air gap) and are electrostatically attracted to one another when a control signal is applied by the controller 180 to the head electrical connection 184 and the disc electrical connection 186. The control signal V is generated by a controller 180 and is coupled by electrical conductors to the first actuator electrode 176 along line 181 and to the second actuator electrode 178 along a circuit common conductor as illustrated. In one embodiment, the voltage applied is less than 5 volts and controlled by pre-amp circuitry contained in control circuitry 130 (FIG. 1).

When providing an electrical connection to head 172, charge can build up on head 172. This may result in electrostatic discharge (ESD) damage. Accordingly, first actuator electrode 176 can be a metallization layer that is insulated from the main body of the head 172 by an insulating layer 175. By using insulating layer 175, the head 172 itself can be connected to ground along line 182 to prevent ESD damage to the head 172. As desired, line 182 can be applied to a suspension (such as suspension assembly 112 in FIG. 1) or to a flexible circuit. Also, bleed resistors can be connected to the slider to further protect from ESD damage. The difference V in electrical potential between the first and second actuator electrodes 176, 178 generates an electrostatic attractive force. In one embodiment, bearing surface plane 179 is positioned between disc 170 and the first actuator electrode 176 to limit the electrostatic attractive forces, which is explained in more detail below in connection with FIG. 5.

Figure 5:
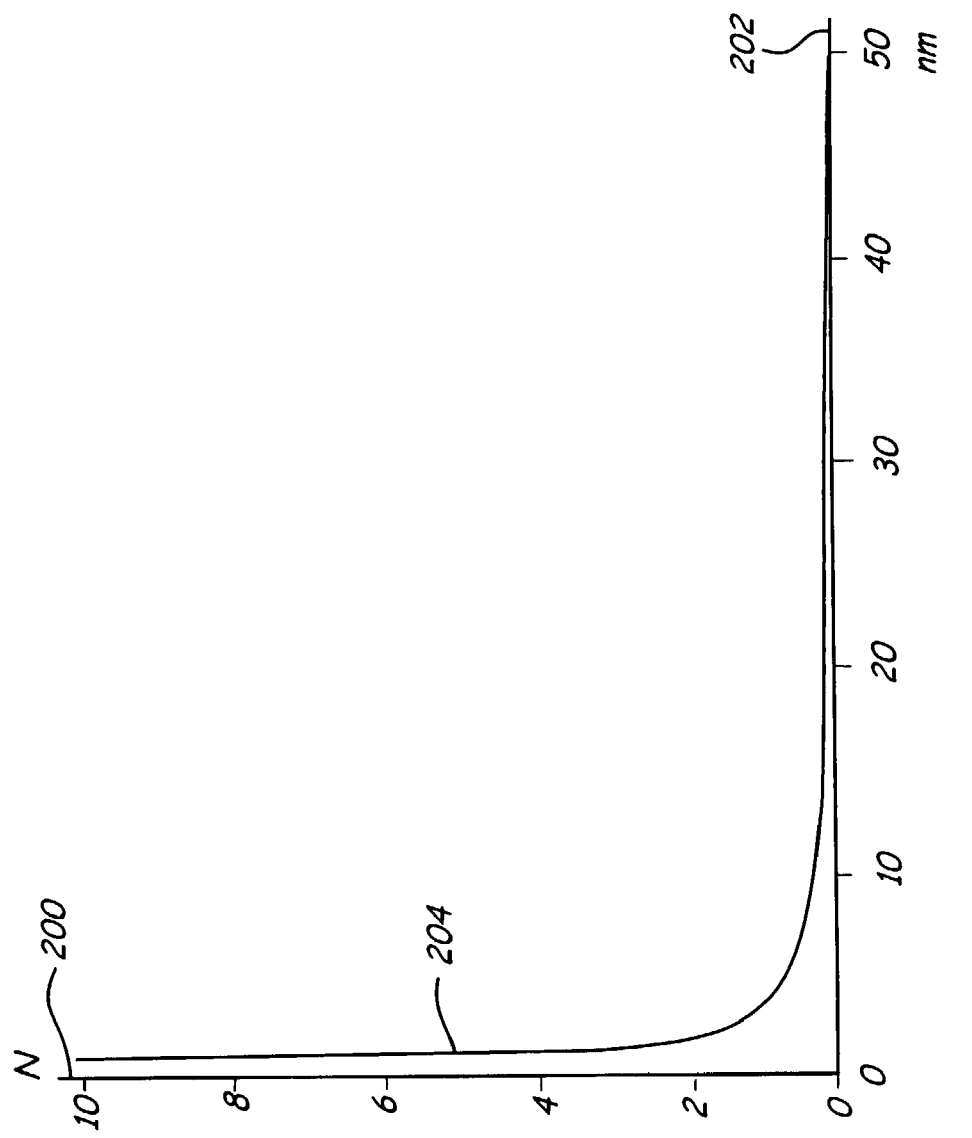
FIG. 5 illustrates electrostatic force between a read/write head and a disc as a function of spacing.

FIG. 5 illustrates electrostatic force in an electrostatic fly height control actuator as a function of actuator spacing. FIG. 5 includes a vertical axis 200 representing electrostatic attractive force in Newtons (N). FIG. 5 includes a horizontal axis 202 that represents mechanical spacing or fly height in nanometers (nm). Since the spacing between the slider and disc surface is so small, a significant amount of electrostatic force can be generated by creating a separate electrode near the slider surface. A voltage is applied to the dedicated electrode and the disc acts as a grounded electrode. Electrostatic fly height control can be used, however, a significant problem arises from the relationship 204 of electrostatic force as a function of spacing. As shown in Equation 1 below, the electrostatic force is approximately inversely related to the spacing squared.

$$F = \frac{(1/2)\varepsilon_0 A V^2}{d^2} \qquad \text{Equation 1}$$

where F is electrostatic attractive force;
$\varepsilon_0$ is the permittivity of the air in the gap;
A is the area of each electrode;
V is the voltage applied to head and disc connections; and
d is the spacing between the electrodes.

This produces the highly non-linear response 204 as shown in FIG. 5. As the spacing approaches a zero spacing asymptote, the force approaches infinity asymptotically. The practical implication of this relationship is that above a certain threshold voltage or below a certain spacing, the attractive force becomes so high that the slider is forced to crash catastrophically into the disc. Moreover, this threshold voltage is not constant and not known ahead of time. Any time that the head is being actuated, or if there is an external condition that causes the head disc spacing to reduce, the slider can be drawn down to the disc and crashed. The electrostatic force is attractive and tends to draw the head toward the disc. The head is also subject to a lift force generated by the air bearing layer between the head and the disc. The combined effect of the lift force and the electrostatic force is explained in more detail below in connection with FIG. 6.

Figure 6:
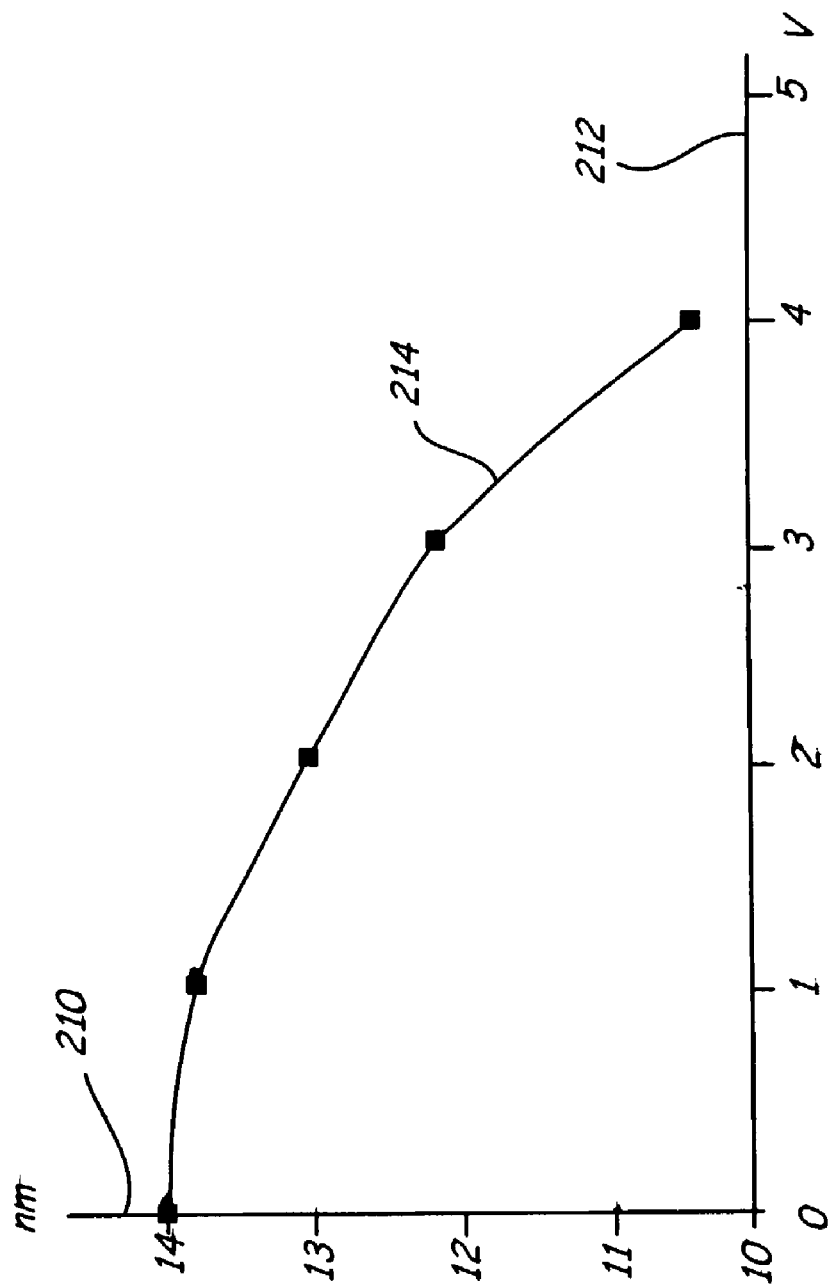
FIG. 6 illustrates spacing between a head and a disc as a function of control signal voltage.
Figure 7:
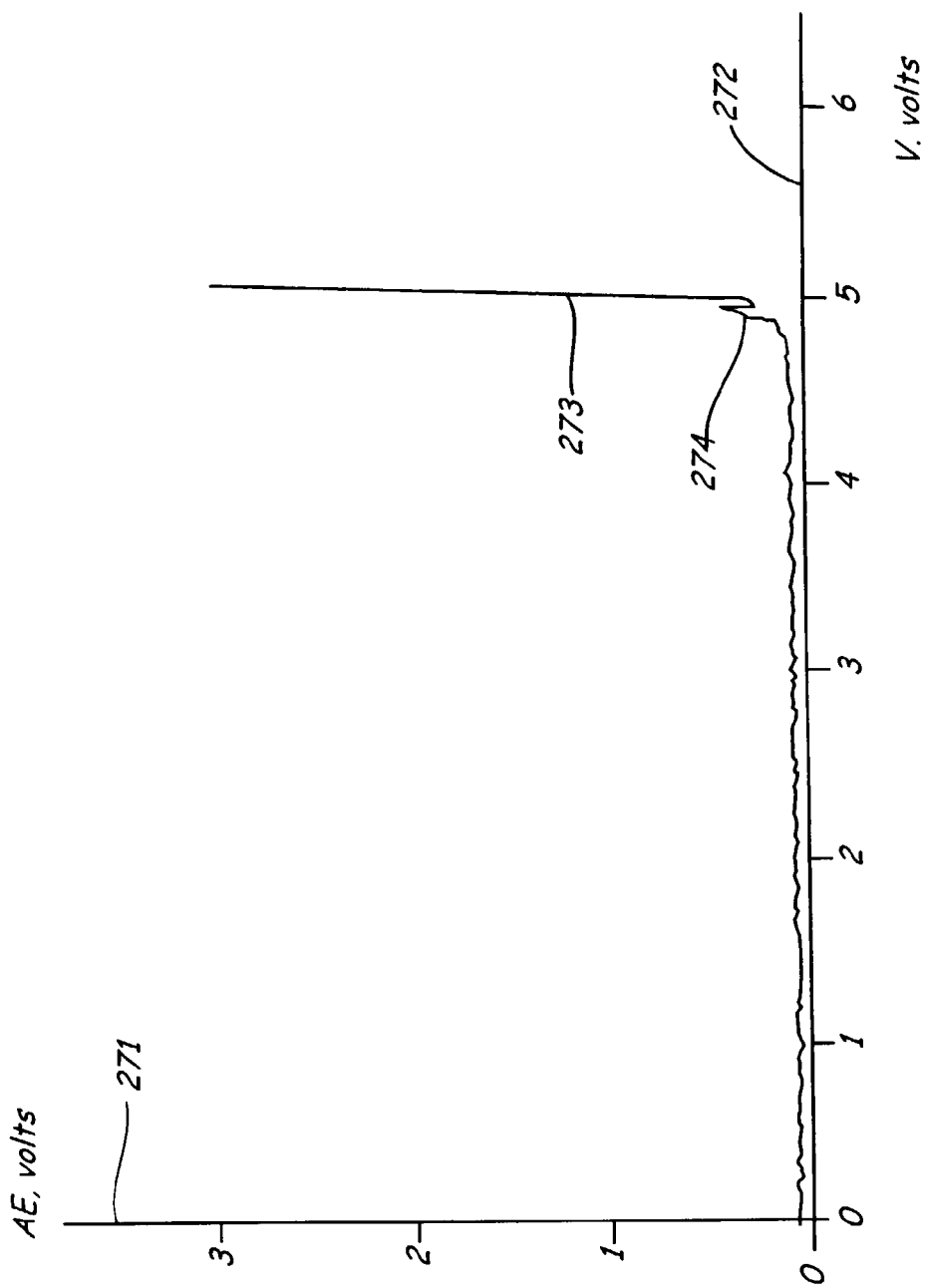
FIG. 7 illustrates an output of an acoustic emission (AE) sensor as a function of electrostatic voltage applied between a read/write head and a disc.

FIG. 6 illustrates fly height gap as a function of electrostatic voltage applied to the head electrical connection 184 and the disc electrical connection 186 for a particular head/disc combination. In FIG. 6, the vertical axis 210 represents the fly height spacing (gap) in nanometers and the horizontal axis 212 represents the voltage V applied to the electrical connections 184, 186. The relationship is non-linear, and as the applied electrostatic voltage increases, the slope of the fly height/voltage curve 214 becomes steeper due to the non-linearity of the electrostatic force as a function of fly height. In regions where the curve 214 becomes steeper, fly height control becomes less stable and contacts and damage could occur as illustrated in FIG. 7 below. This damage may be avoided or reduced, however, by the air bearing surface arrangements illustrated in FIGS. 8–32 below.

FIG. 7 shows a typical response curve of an acoustic emission (AE) sensor (such as sensor 149 in FIG. 3) as a function of an electrostatic voltage V applied to a head electrical connection and a disc electrical connection on a spin test stand. The vertical axis 271 represents acoustic emission sensor output and the horizontal axis 272 represents applied electrostatic voltage V. For this exemplary head/disc combination the slider crashed at just under V=5 volts as illustrated at 273. Similar head/disc combinations have shown a range of threshold voltage for contact from V=1.0 to 5.5 volts. An increase 274 in acoustic emission sensor output just prior to crashing is not consistent and therefore does not provide an adequate means of sensing and avoiding contact. Contact has occurred without any initial increase 274 in acoustic emission sensor output.

As appreciated by those skilled in the art, head sliders of the present invention may include a variety of different air-bearing designs and features in order to practice the present invention. Such features include, but are not limited to, bumps, bulges, raised portions, protrusions, rails, pads, channels, recesses and other features. As described below, several of the features include a bearing surface and a raised portion. When the sliders are positioned relative a disc, the bearing surfaces will generally be positioned closer to the disc than the other surfaces. Illustratively, the bearing surfaces are generally in a plane that, for the purpose of the present description, will be referred to as a bearing surface plane. One or more electrodes are positioned on the raised portion and may be displaced from the bearing surface plane by a spacing. The spacing can be adjusted upon fabrication of the slider to control the amount of voltage required to adjust the fly height spacing and prevent the electrodes and the head itself from contacting the disc. A desired spacing can be determined using a variety of tests and techniques such as those discussed with relation to FIGS. 5–7. It should further be noted that the electrodes may be positioned on different portions of the slider, as desired.

Figure 8:
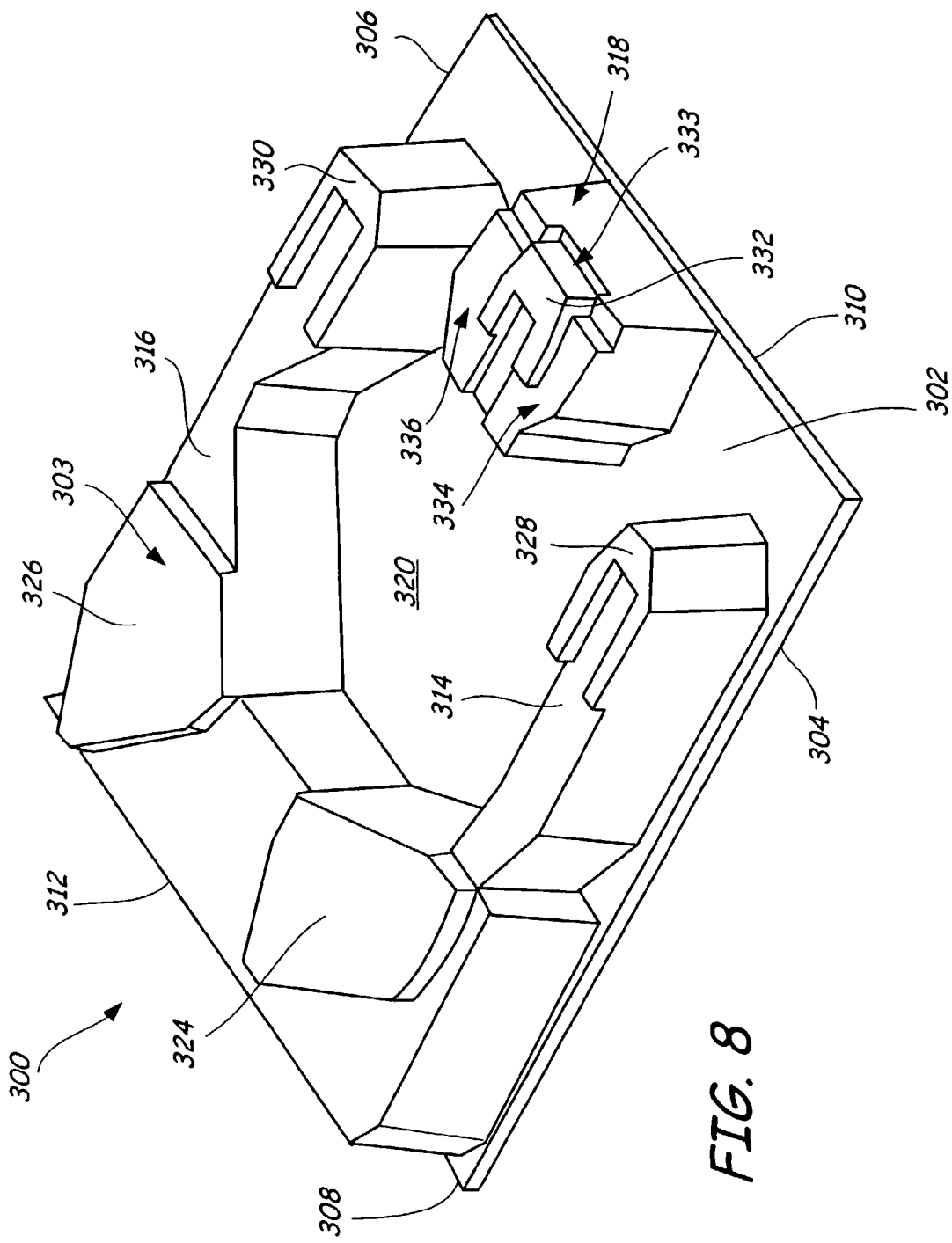
FIG. 8 illustrates a perspective view of a head slider.
Figure 9:
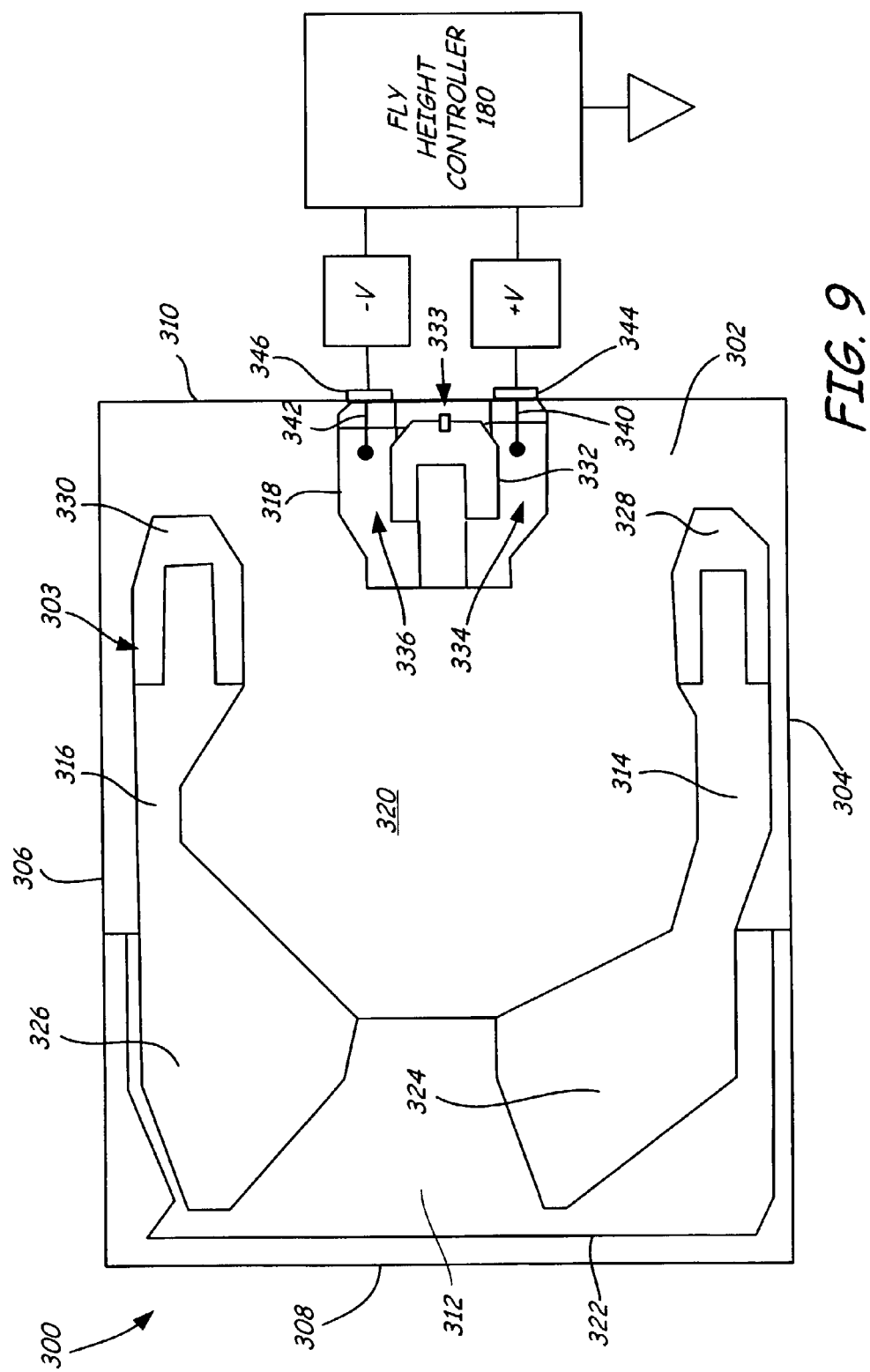
FIG. 9 illustrates a plan view of the slider illustrated in FIG. 8.

FIG. 8 is a perspective view of a slider 300 as viewed from a surface of a disc. The vertical dimensions are exaggerated in FIG. 8 for clarity. FIG. 9 is a plan view of slider 300 as viewed from the surface of the disc. Slider 300 is illustratively designed to operate in the manner similar to the operation of slider 172 described in relation to FIG. 4.

Slider 300 is formed of substrate having a slider body 302 that includes an air bearing surface 303, a first side edge 304, a second side edge 306, a leading edge 308 and a trailing edge 310. A number of features are formed on slider body 302. For example, slider 300 includes cavity dam 312, first side rail 314, second side rail 316 and center pad 318. Trailing the cavity dam is a sub-ambient pressure cavity 320. A step surface 322 precedes cavity dam 312.

Side rail 314 and 316 include leading surfaces 324 and 326, respectively. Furthermore, side rail 314 and 316 include trailing surfaces 328 and 330, respectively. As illustrated, trailing surfaces 328 and 330 are generally "U" shaped. Center pad 318 includes raised U-shaped surface 332 and carries a transducer, shown generally at 333. Collectively, leading surfaces 324 and 326, trailing surfaces 328 and 330, and raised surface 332 are raised portions that form air bearing surface 303, which is coplanar with a bearing surface plane 350 (FIG. 10).

Slider 300 includes a first fly height control electrode 334 and a second fly height control electrode 336 disposed on center pad 318. As illustrated, raised surface 332, when air bearing surface 303 faces a disc surface, is positioned between the disc surface and each of the fly height control electrodes 334 and 336. Thus, the bearing surface plane 350 coplanar with raised surface 332 is displaced from fly height control electrodes 334 and 336. Accordingly, there exists spacing between the bearing surface plane 350 and electrodes 334 and 336, as described below with respect to FIG. 10.

Referring to FIG. 9, fly height controller 180 can provide voltages to electrodes 334 and 336 in order to generate an electrostatic force between slider 300 and a disc. In this embodiment, electrodes 334 and 336 are of equal area. Electrical leads 340 and 342 respectively couple electrode 334 and 336 to bond pads 344 and 346. Bond pads 344 and 346 are electrically coupled to fly height controller 180. Alternatively, one or more bond pads may be used. In some instances, it may be difficult to provide an electrical connection to a media surface. In the embodiment illustrated, fly height controller 180 simultaneously provides a positive voltage "+V" to electrode 334 and a negative voltage "−V" to electrode 336. Illustratively, the voltages provided to each of the electrodes 334 and 336 is of equal magnitude as well as have opposite polarity. Since each of the electrodes are charged with opposite polarity, consequently a net charge to the disc is zero. Thus, undesirable voltage potential on the disc can be prevented. However, the voltage differential still creates an electrostatic force between slider 300 and the disc.

Figure 10:
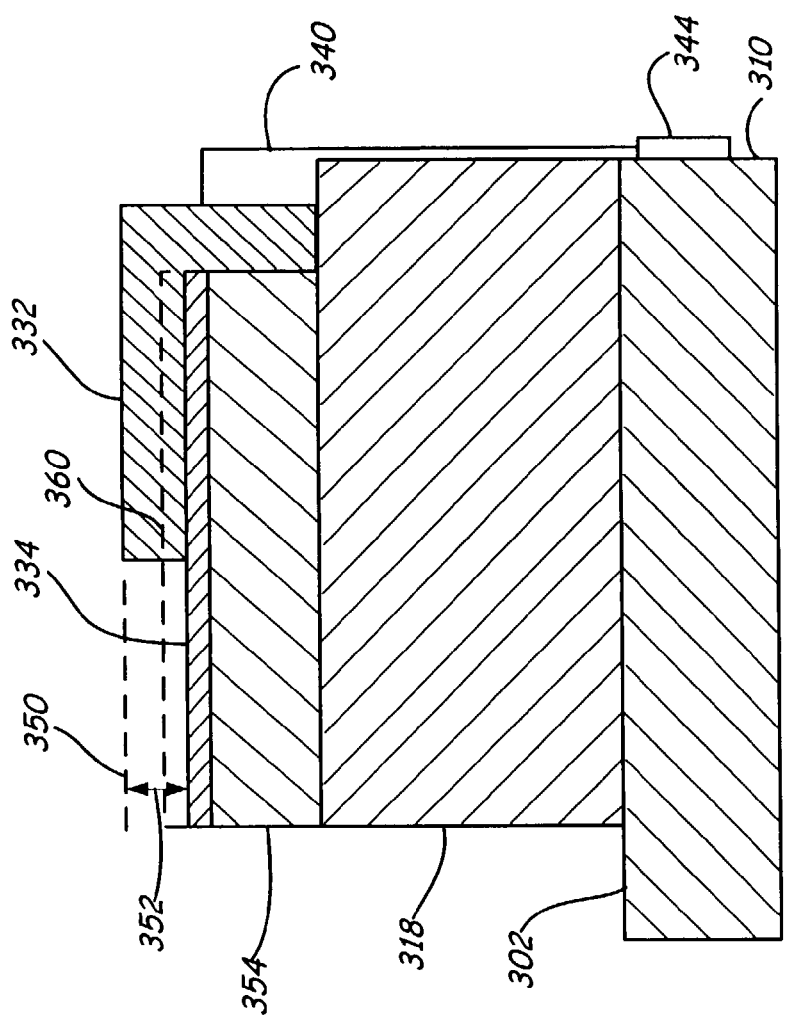
FIG. 10 illustrates a schematic section of a portion of the slider illustrated in FIG. 8.

FIG. 10 illustrates a schematic view of a section of slider 300 as viewed from first rail 314. Raised surface 332 is coplanar with bearing surface plane 350. First electrode 334 is displaced from bearing surface plane 350, by spacing 352. Insulating layer 354 provides insulation between electrode 334 and center pad 318. In one embodiment, spacing 352 is in the range of about 0.005 microns to 0.05 microns. Electrode 334 has a thickness of about 100 Å and insulating layer 354 has a thickness of about 0.20 microns to 0.25 microns.

Positioning of electrodes displaced from a bearing surface plane can be accomplished using a number of different techniques. According to one such technique, the electrodes 334 and 336 are positioned during fabrication of the slider 300. For example, slider body 302 may be milled or etched such that center pad 318 and raised surface 332 remain. In addition, electrical lead 340, which has been connected to bond pad 344, is left exposed. Insulating layer 354 is then applied to a top surface of center pad 318, for example by using thin film deposition techniques such as sputtering and/or ion beam deposition. Next, electrode 334 is positioned on insulating layer 354, leaving spacing 352 between bearing surface plane 350 and electrode 334. Electrode 334 is also illustratively applied using a thin film deposition technique. After electrode 334 is positioned, lead 340 is connected to electrode 334. Electrode 336 is positioned relative to bearing surface plane 350 and connected to lead 342 in a similar manner to electrode 334.

If desired, a buffer layer 360 may be placed on top of electrode 334. The buffer layer 360 can serve as a protective barrier to mitigate contact. Additionally, buffer layer 360 can prevent smearing, corrosion, degradation through processing and other undesirable effects on the electrode both during manufacture and operation of a disc drive. The buffer layer 360 may also provide another dielectric layer (in addition to the air gap described above) between the conductive plates serving as capacitors (i.e. electrodes 176 and 178 of FIG. 4). This layer alters the electrostatic force between the plates, which effects fly height control.

In one embodiment, buffer layer 360 is an insulator, having a film resistivity in the range of about $1 \times 10^{12}$ to $1 \times 10^{20}$ Ohm-cm. In this situation, an alternating current (AC) can be applied to the conductive plate to prevent charge from building on the buffer layer 360. A frequency of the AC may be selected to prevent undesirable modulation of electrostatic force between the capacitors of the electrostatic fly height actuator. In another embodiment, a semi-insulating layer for buffer layer 360 is used, having a film resistivity in the range of about $1 \times 10^{6}$ to $1 \times 10^{10}$ Ohm-cm. In this case, the buffer layer 360 may be a mixture of aluminum oxide and zinc oxide. As known in the art, the mixture may be applied using an ALD process to achieve the desired resistivity. Alternatively, the semi-insulating layer may be made of diamond-like-carbon (DLC). The buffer layer 360 maintains a similar voltage to electrode 334, however, in the event of contact between buffer layer 360 and a disc, current between the buffer layer 360 and the disc will be minimal and prevent damage.

Figure 11:
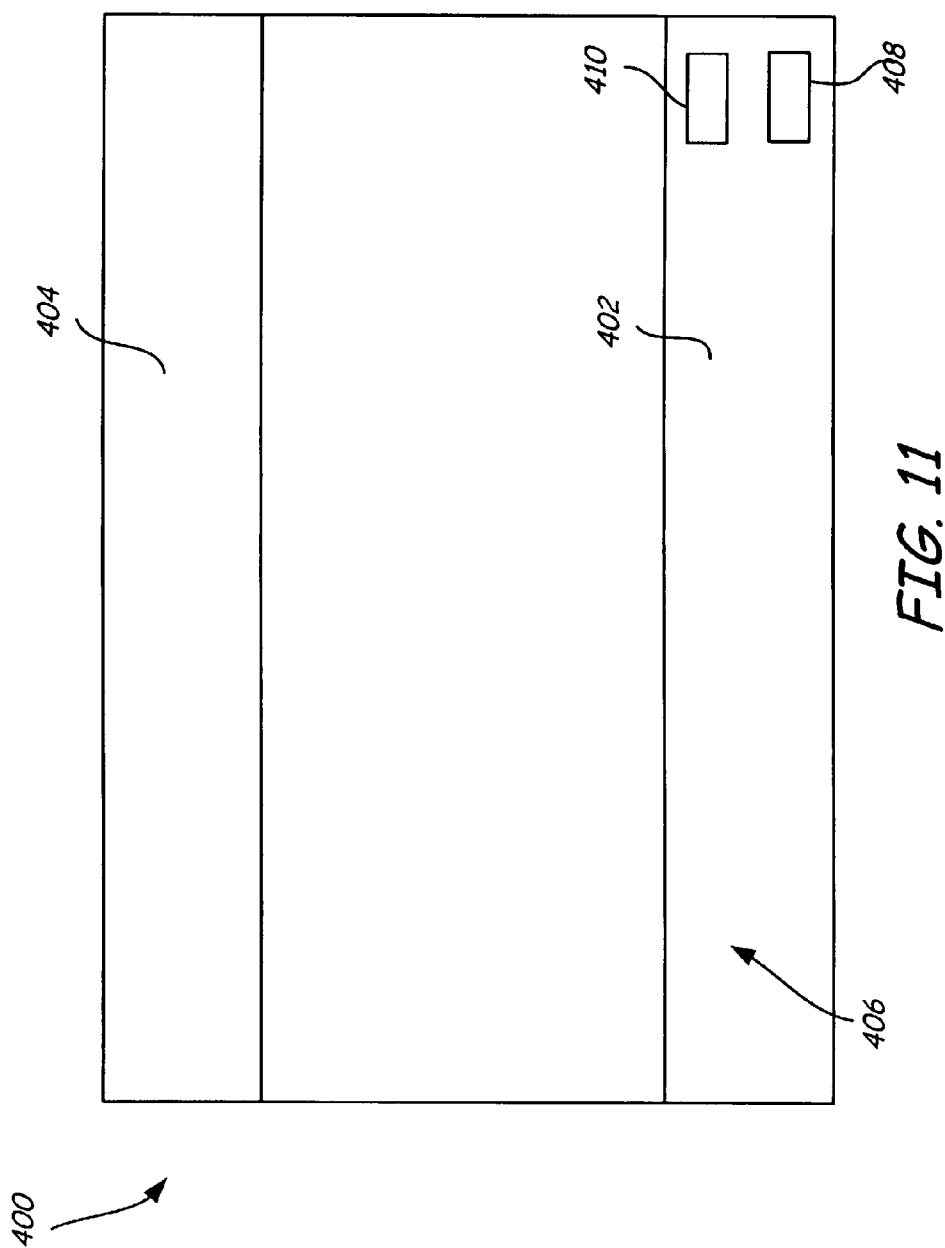
FIG. 11 illustrates a schematic plan view of a slider having an alternative design.

As illustrated in FIG. 11, different air bearing arrangements and electrode positioning may be used for a slider. FIG. 11 schematically illustrates slider 400, including side rails 402 and 404. Slider 400 is illustratively designed to operate in the manner similar to the operation of slider 172 described in relation to FIG. 4. At least a portion of side rails 402 and 404 form an air bearing surface 406, which is coplanar with a bearing surface plane. Electrodes 406 and 408 can be displaced from the bearing surface plane. As described above, slider 400 can include an electrical connection, insulating layer, bond pads, air bearing features and other components. In addition, slider 400 may be fabricated similar to the fabrication of slider 300 described above.

Figure 13:
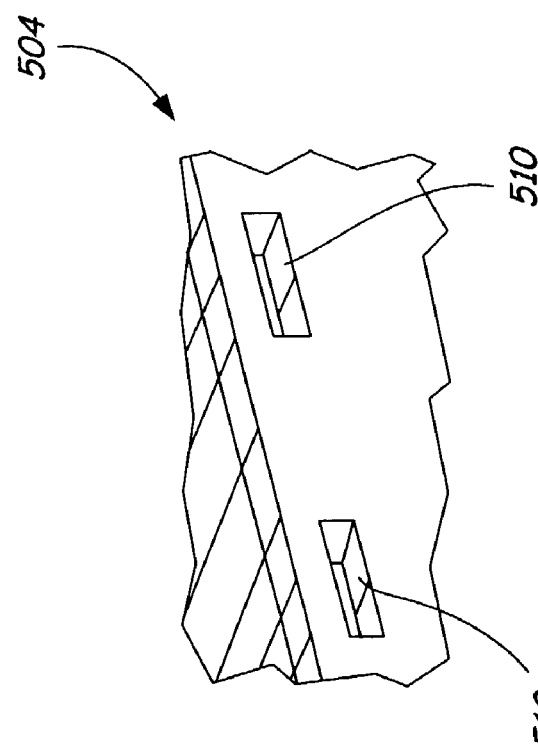
FIGS. 12–18 illustrate fabricating a slider.
Figure 12:
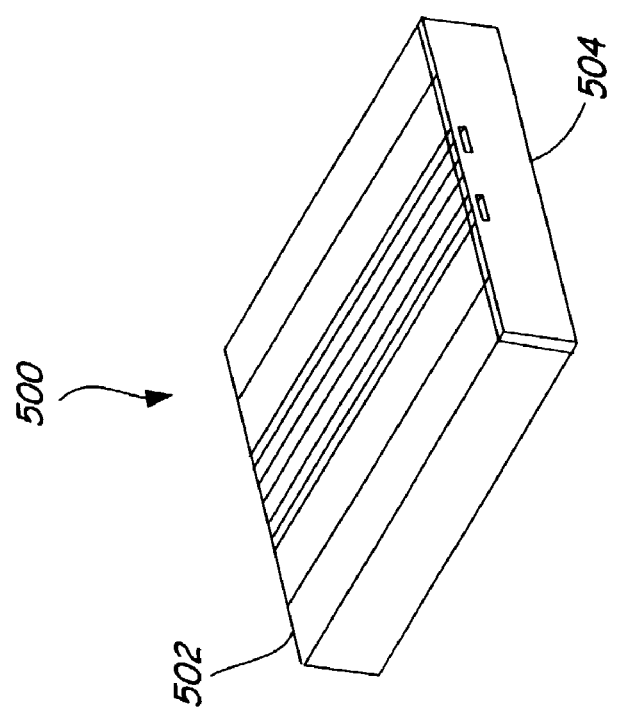
Figure 14:
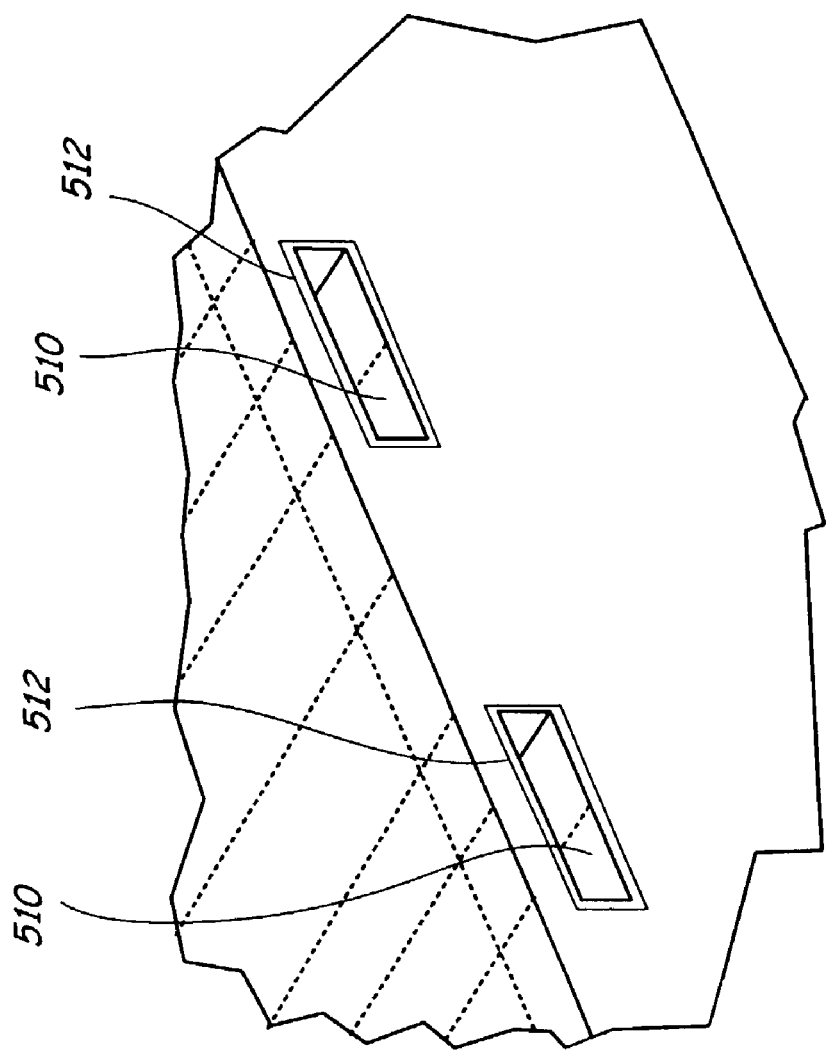

As appreciated by those skilled in the art, providing dedicated fly height control electrodes electrically isolated from the slider body may be achieved using different fabrication techniques. For example, the fly height control electrodes may be provided on the slider body at a slider level or a wafer level. FIGS. 12–18 illustrate a first approach for providing fly height control electrodes to a slider body. FIG. 12 illustrates substrate 500 having leading edge 502 and trailing edge 504. FIG. 13 illustrates an exploded view of a portion of trailing edge 504. At this point in the fabrication process, substrate 500 has not had an air bearing surface etched on its surface. Initially, cavities 510 are etched into trailing edge 504, illustratively near a center of trailing edge 504. As shown in FIG. 14, cavities 510 are coated with an insulating layer 512. Insulating layer 512 serves to electrically isolate a fly height control electrode from substrate 500.

Figure 15:
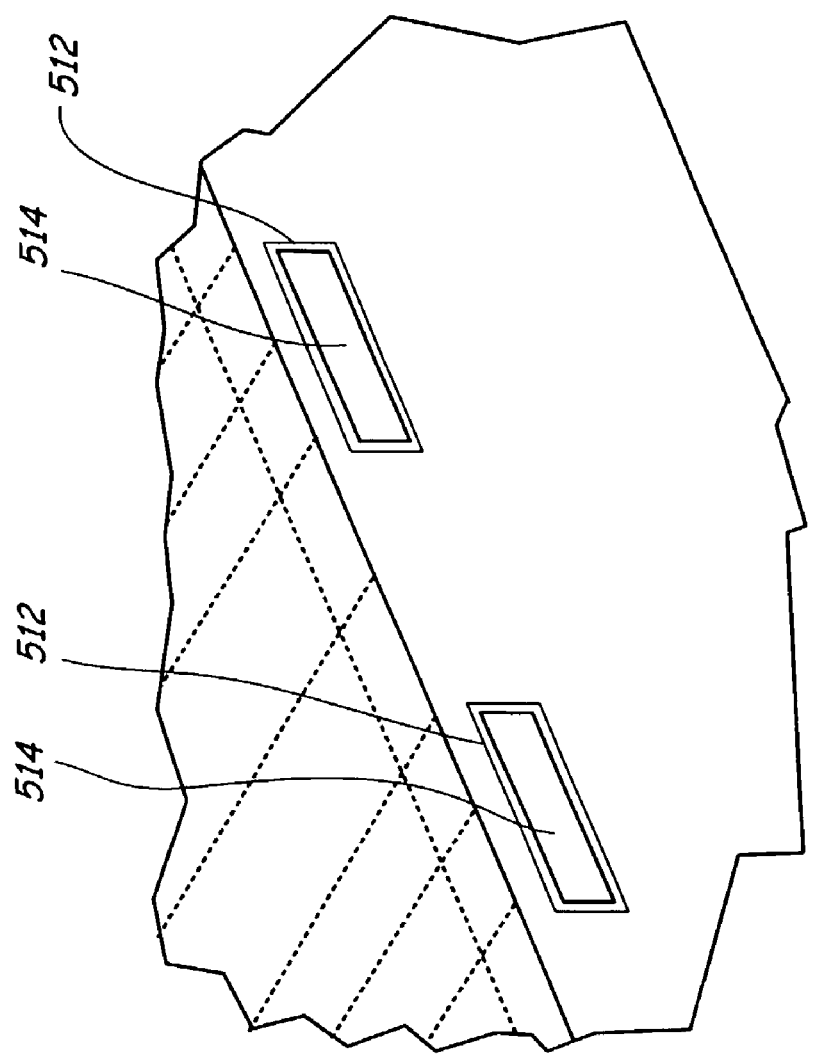
Figure 16:
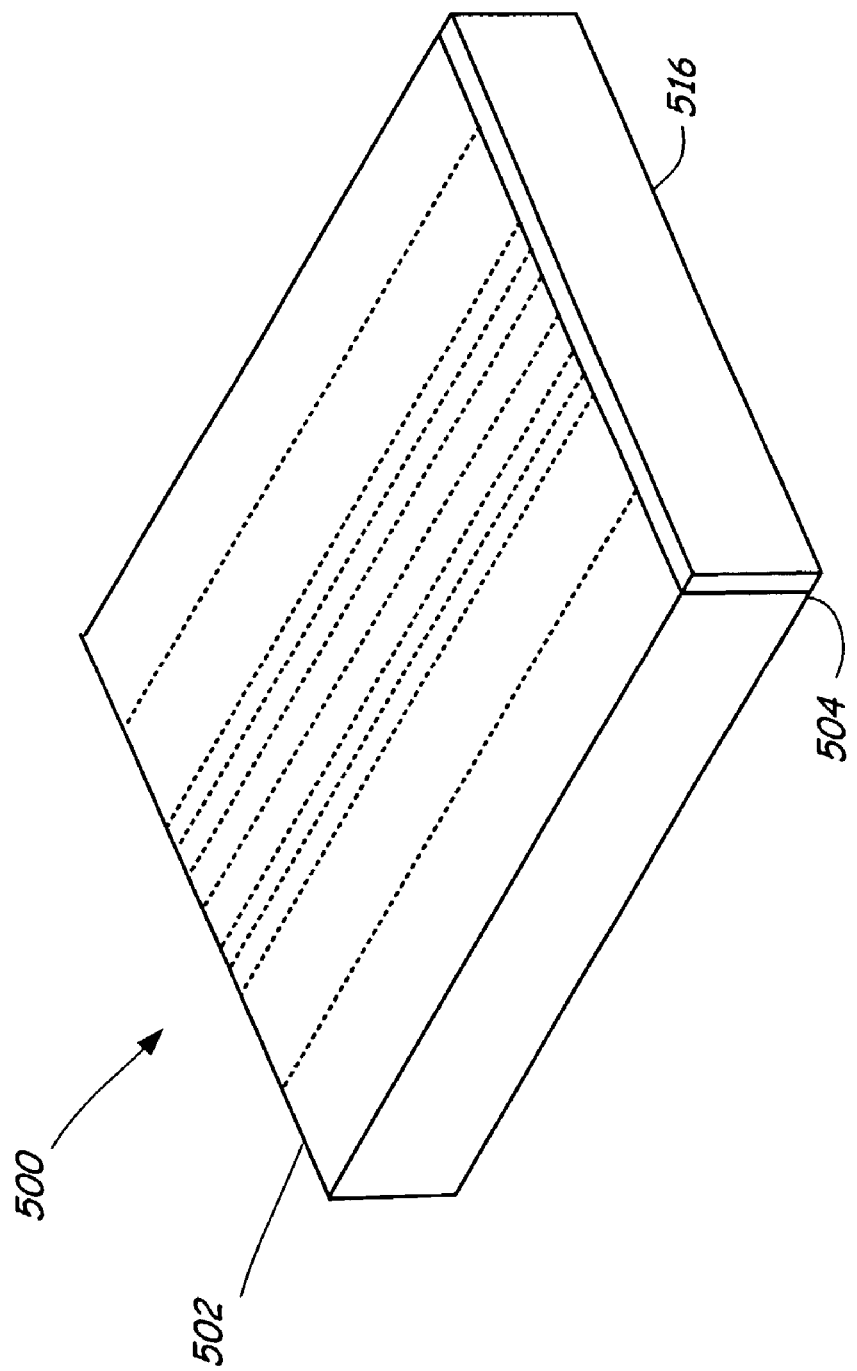
Figure 17:
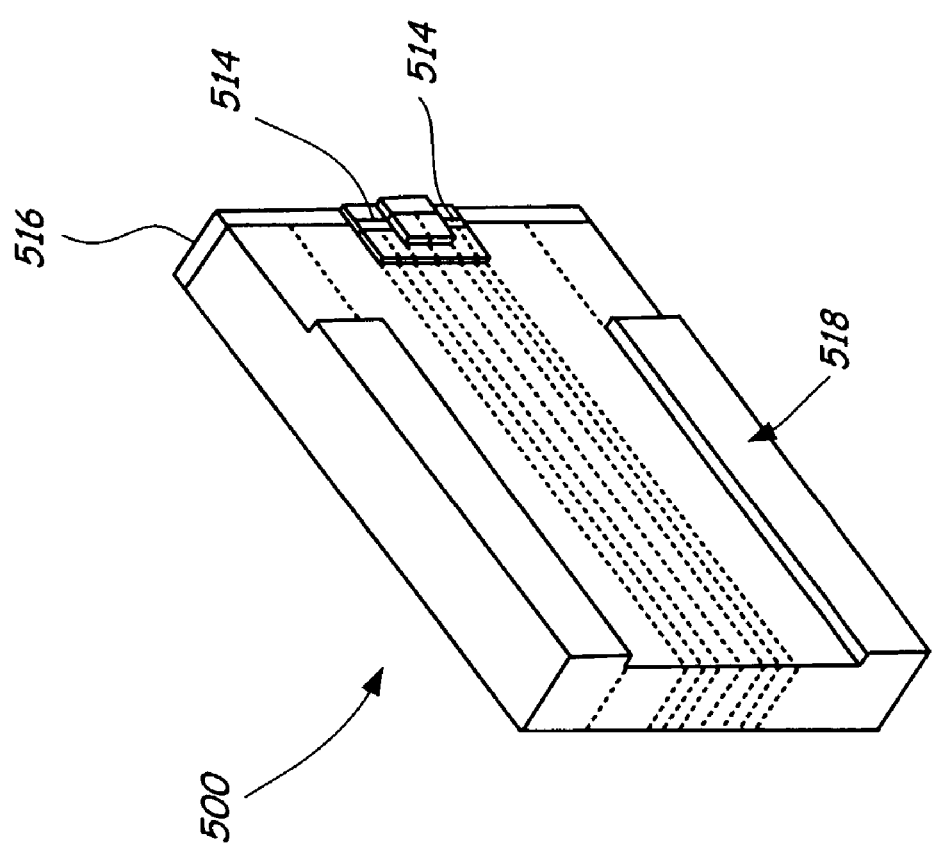
Figure 18:
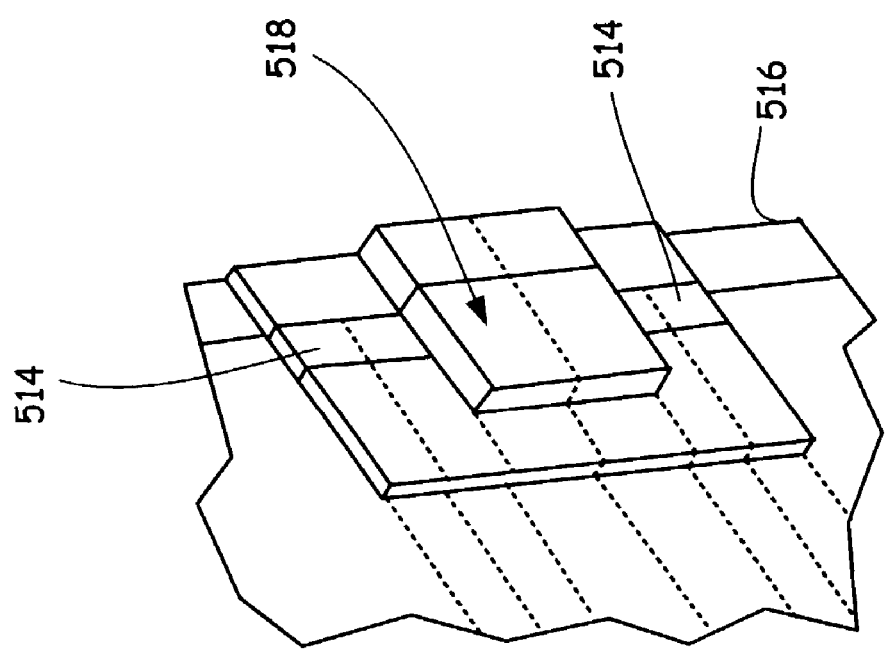

As illustrated in FIG. 15, the remaining portion of cavities 510 are injected with a conductive material 514. After conductive material 514 is inserted into cavities 510, a transducer layer 516, as illustrated in FIG. 16, is built on trailing edge 504. Next, as illustrated in FIGS. 17 and 18, an air bearing surface 518 is etched or otherwise machined on substrate 500, thereby exposing conductive material 514, which serves as two fly height control electrodes electrically isolated from substrate 500. At this point, electrodes 514 may be electrically connected to a fly height controller. For example, bond pads may be provided on the transducer layer 516 and connected to electrodes 514 by boring through transducer layer 516.

Figure 20:
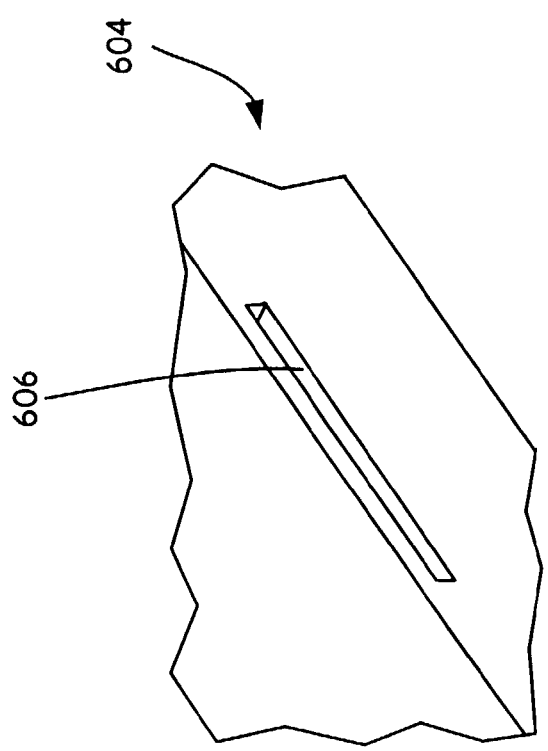
FIGS. 19–23 illustrate fabricating a slider according to another method.
Figure 19:
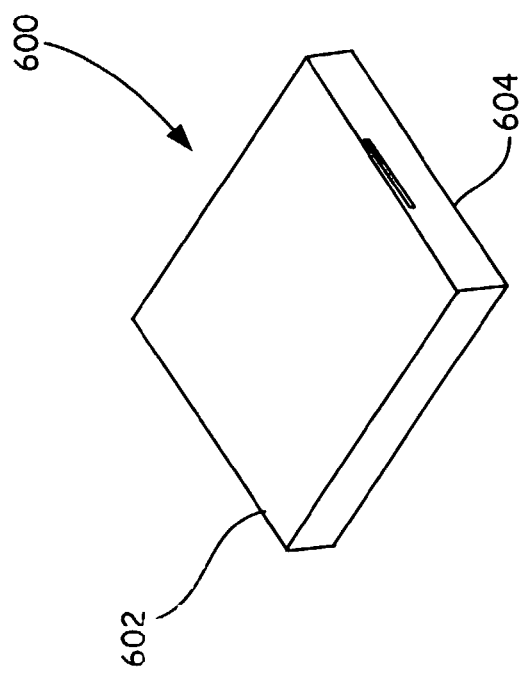
Figure 21:
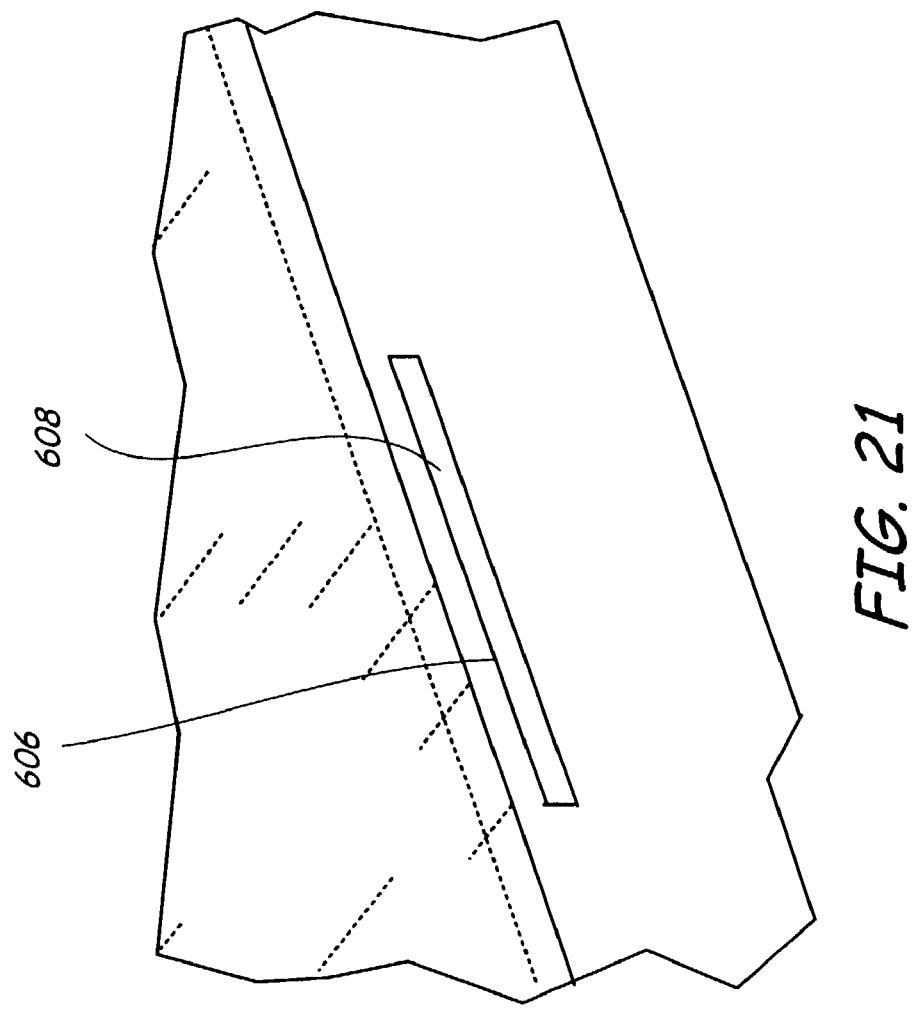
Figure 22:
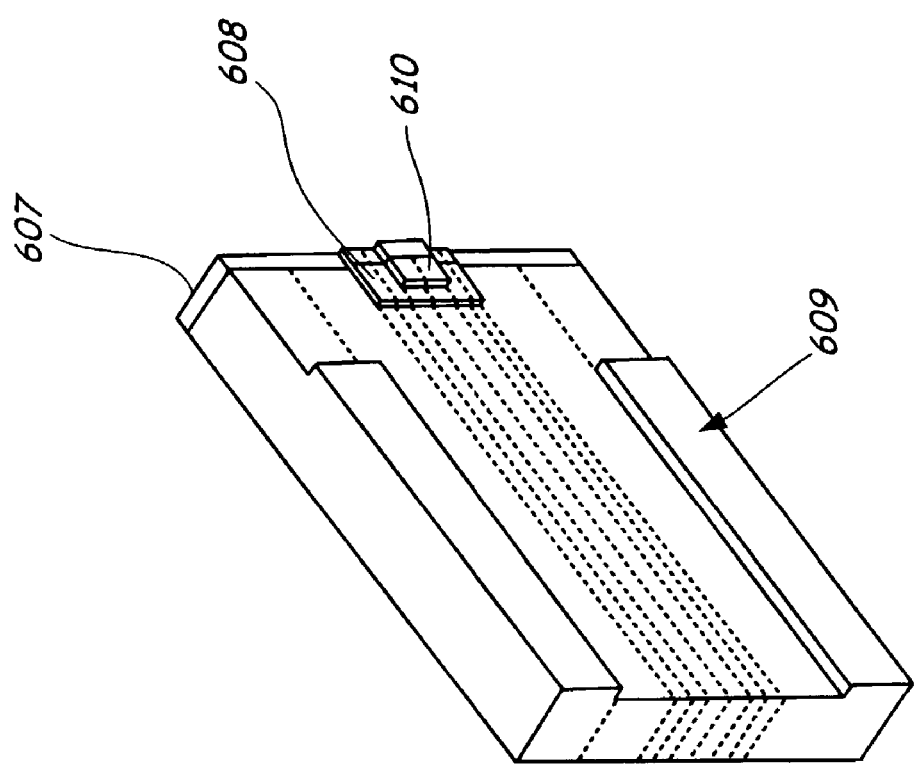
Figure 23:
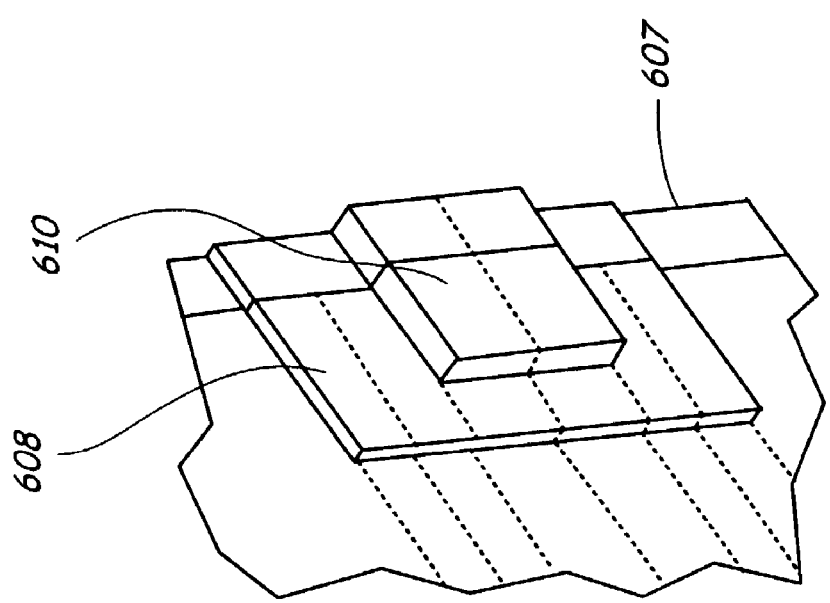
Figure 24:
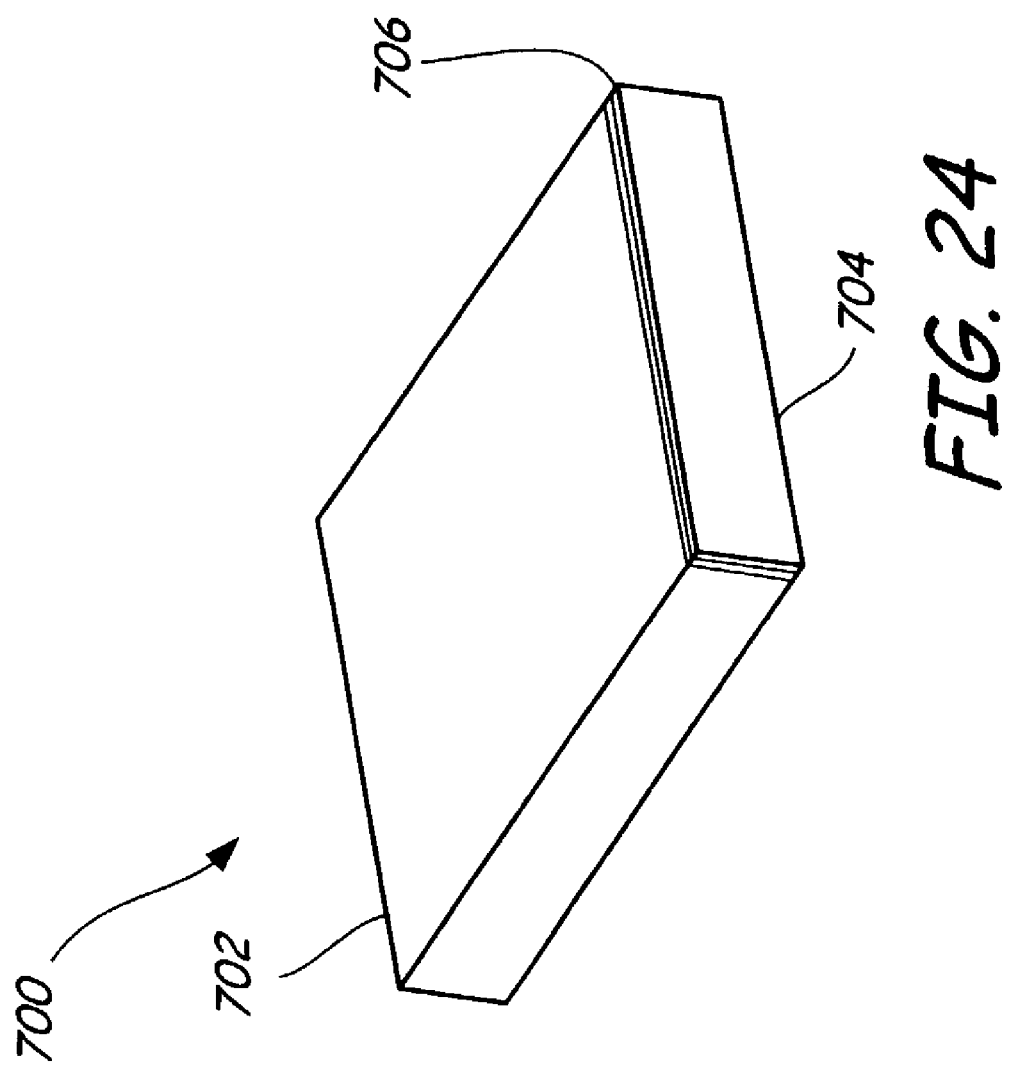
FIGS. 24–27 illustrate fabricating a slider according to another method.

Another approach to fabrication is illustrated in FIGS. 19–23. In FIG. 19, a slider substrate 600 having a leading edge 602 and trailing edge 604 is illustrated. In FIG. 20, a cavity 606 is illustrated, which has been etched into a center of trailing edge 604. Cavity 606 is filled with an insulating material 608 as illustrated in FIG. 21. After a transducer layer 607 is applied, an air bearing surface 609 is etched in order to expose insulator material 608 as shown in FIG. 22. As illustrated in FIG. 23, a portion 610 of the substrate 600 serves as a fly control electrode while insulator material 608 electrically isolates electrode 610 from the substrate 600. Essentially, electrode 610 is of the same material as substrate 600. Thus, both are etched at the same rate, which reduces the complexity of manufacturing a slider.

Figure 25:
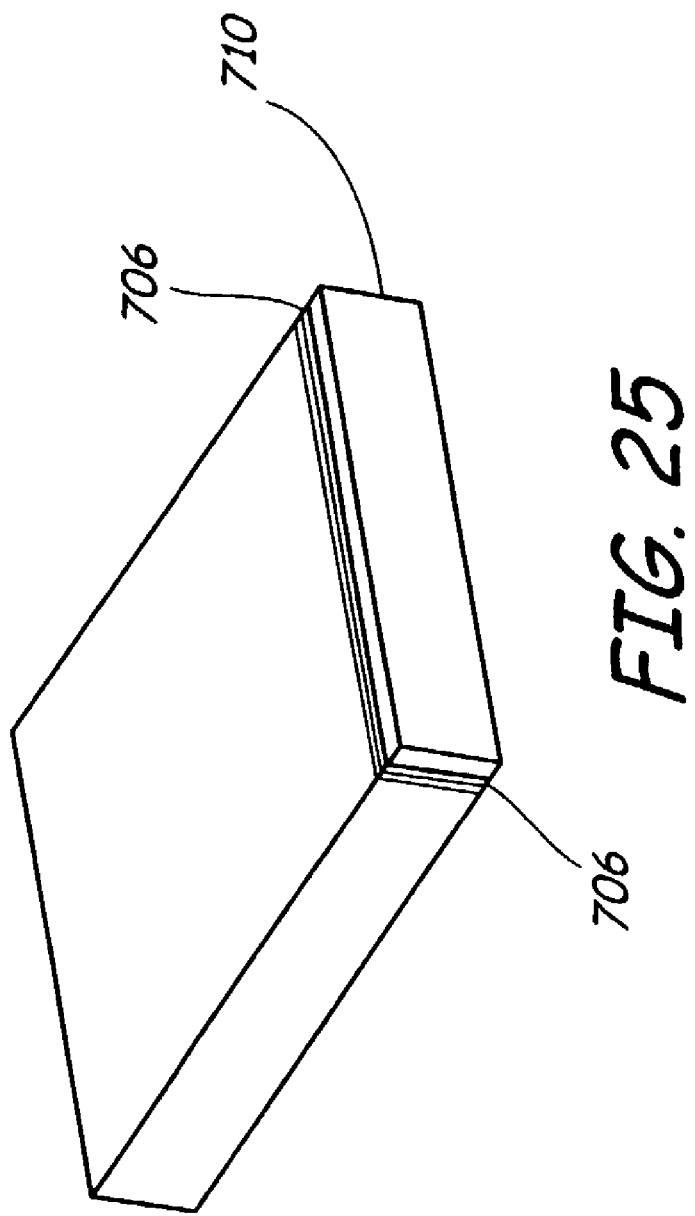
Figure 26:
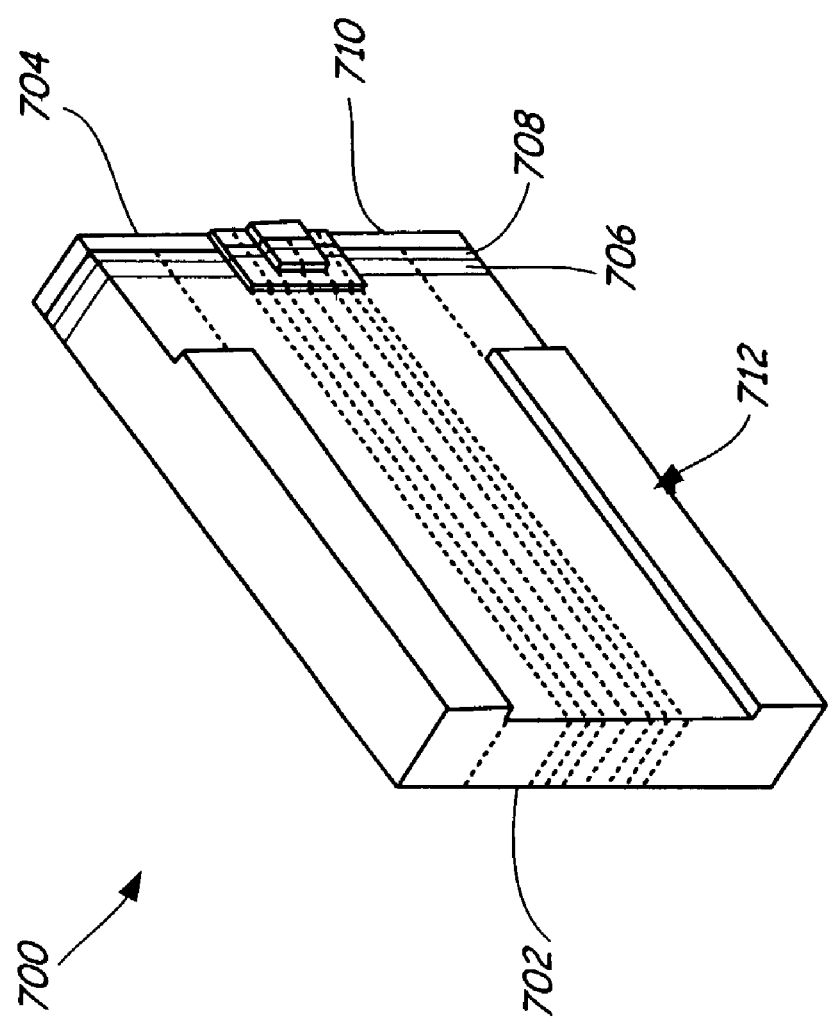
Figure 27:
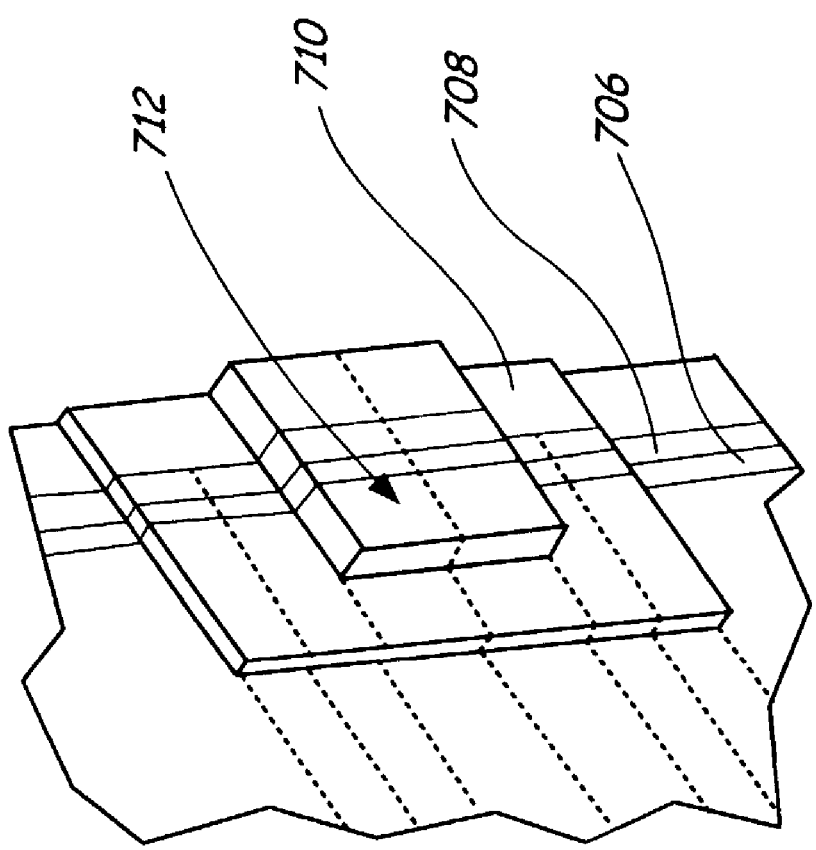

Yet another embodiment of applying an electrically isolated dedicated electrode to a slider body is illustrated in FIGS. 24–27. In this approach, substrate 700 includes leading edge 702 and trailing edge 704. First, an insulating layer 706 is applied to trailing edge 704. Additionally, a conductive material 708 is applied that will serve as a fly height control electrode electrically isolated from substrate 700. Next, as illustrated in FIG. 25, a transducer layer 710 is built. FIGS. 26 and 27 illustrate substrate 700 after an air bearing surface 712 has been applied. Although illustrated wherein insulating layer 706 and conductive material 708 extend substantially along trailing edge 704, insulating layer 706 and conductive material 708 may be applied to only a portion of trailing edge 704 if desired, for example a portion near a center of trailing edge 704.

Figure 28:
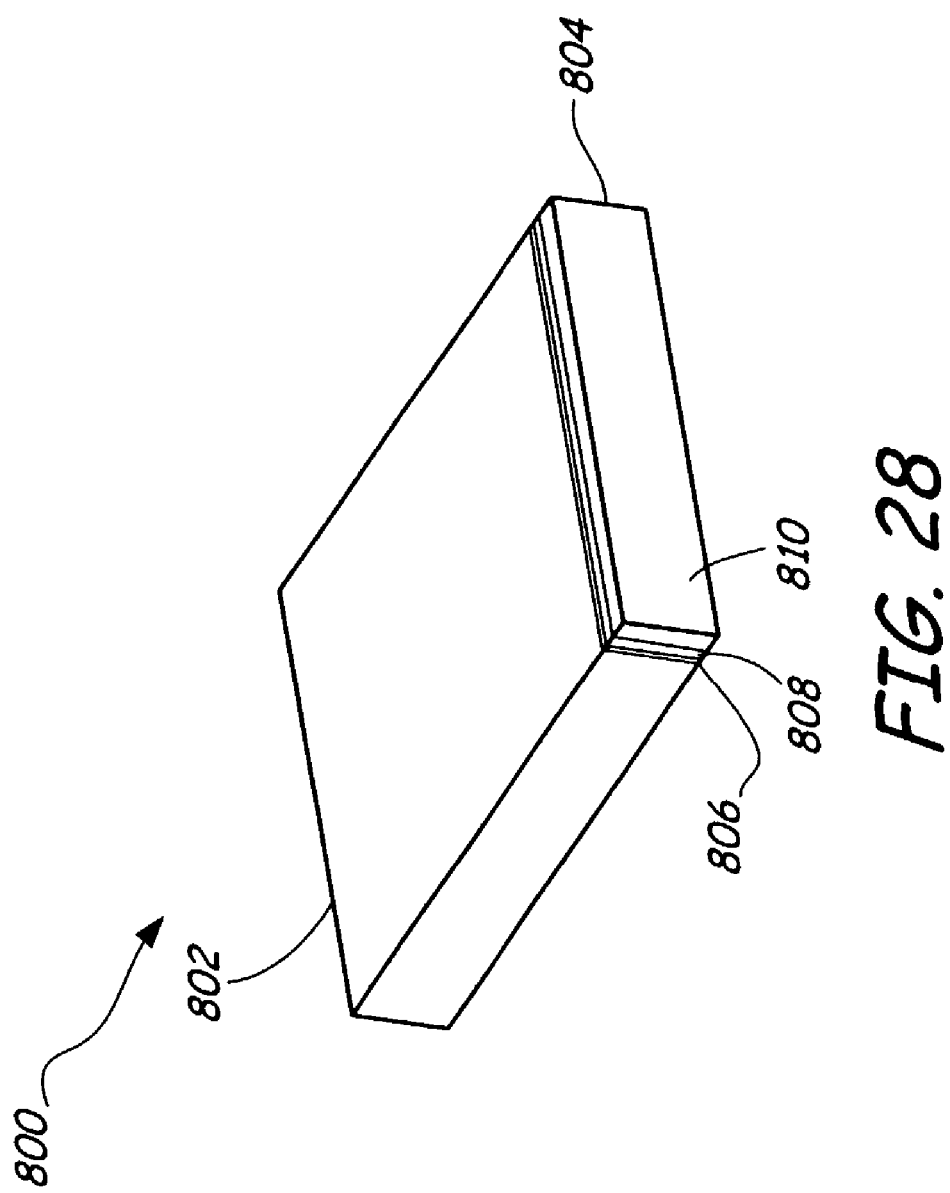
FIGS. 28–30 illustrate fabricating a slider according to another method.
Figure 29:
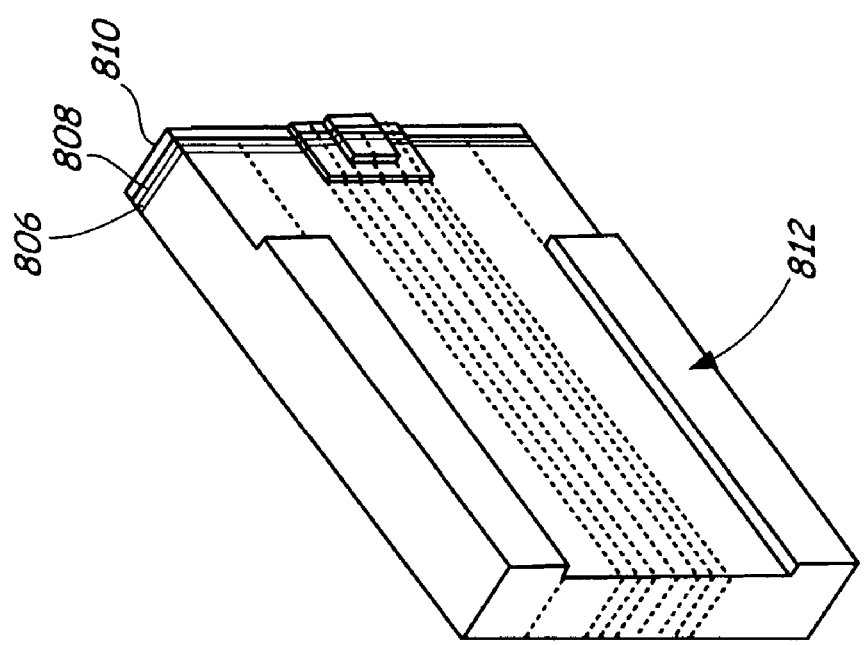
Figure 30:
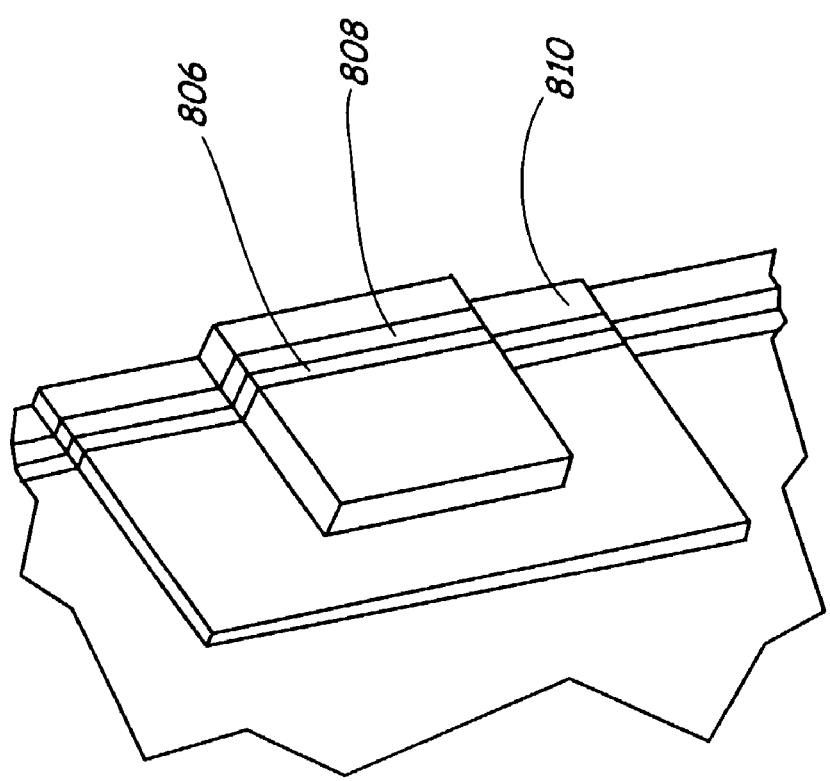

FIGS. 28-30 illustrate yet another embodiment for applying a fly height control electrode isolated from the slider body. In FIG. 28, substrate 800 includes leading edge 802 and trailing edge 804. A transducer layer 806, conductive material 808 and cover coat 810 are each applied to trailing edge 804. In FIGS. 29 and 30, an air bearing surface 812 has been etched. Conductive material 808 serves as a fly height control electrode that is electrically isolated from substrate 800 by transducer layer 806. Although illustrated wherein transducer layer 806 and conductive material 808 extend substantially along trailing edge 804, transducer layer 806 and conductive material 808 may be applied to only a portion of trailing edge 804 if desired, for example a portion near a center of trailing edge 804.

Figure 31:
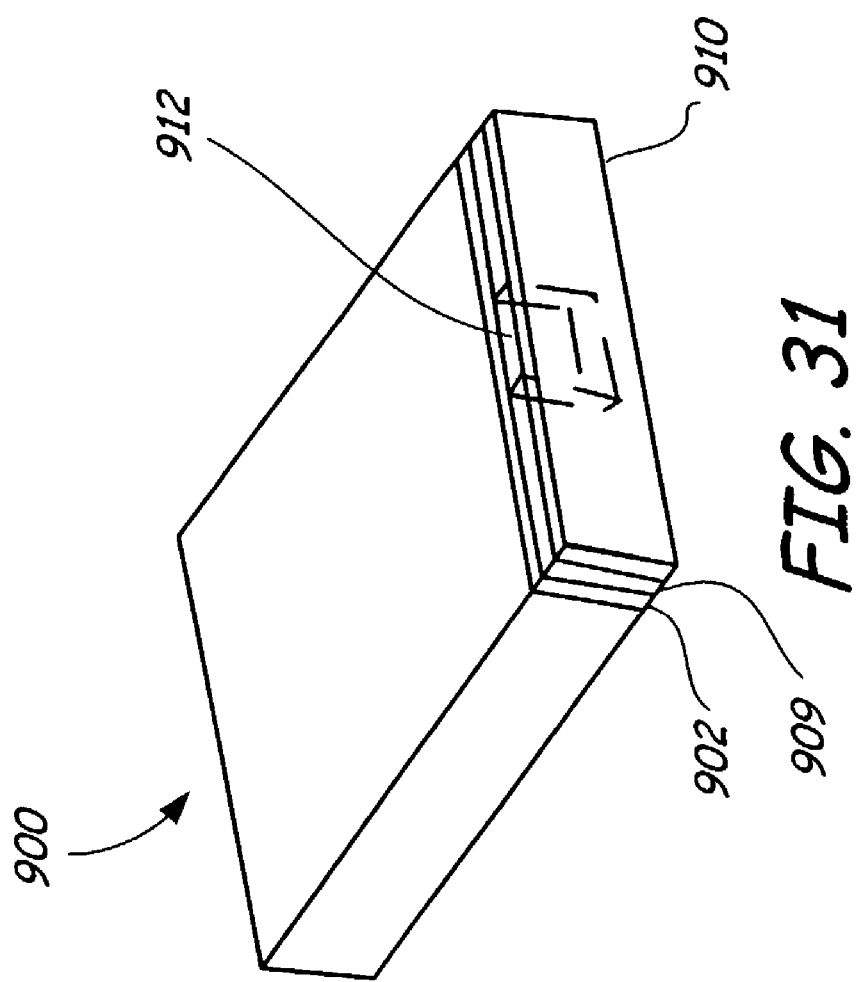
FIGS. 31 and 32 illustrate a slider fabricated according to another method.
Figure 32:
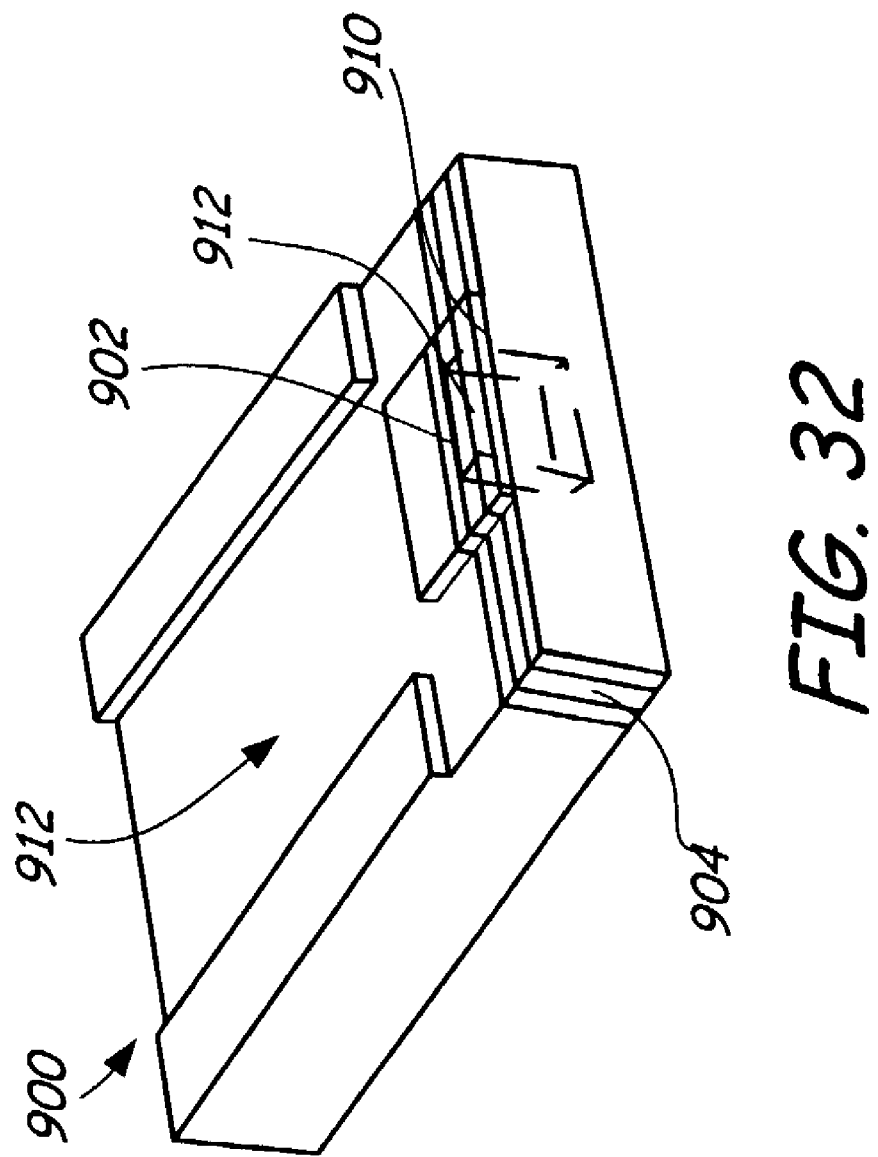

As appreciated by those skilled in the art, layers previously described do not need to be applied to substantially an entire trailing edge. As illustrated in FIGS. 31 and 32, substrate 900 includes transducer layer 902, intermediate layer 904 and cover coat 910. Conductive material 912 only applied to a center portion of a trailing edge as a portion of intermediate layer 904. FIG. 32 illustrates substrate 900 after an air bearing surface 914 has been applied.

In summary, a head (172, 300, 400, 500, 600, 700, 800, 900) for use in accessing data from an electrically conductive media surface (170) is provided. The head (172, 300, 400, 500, 600, 700, 800, 900) has a slider body (302) with an air bearing surface (177, 303, 406, 518, 609, 712, 812) defining a bearing surface plane (179, 350) configured to face the media surface (170). A fly height control electrode (176, 334, 336, 408, 410, 514, 610, 708, 808, 902) is positioned on the raised portion (179, 350). Further, the fly height control electrode (176, 334, 336, 408, 410, 514, 610, 708, 808, 902) and the media surface (170) are adapted to form opposing plates of a capacitor with a dielectric layer of air supporting the head (172, 300, 400). Also, the electrode (176, 334, 336, 408, 410, 514, 610, 708, 808, 902) is electrically isolated from the slider body (302). A head electrical connection (184) disposed on the slider body (302) is electrically connected to the electrode (176,334, 336,406, 408, 514, 610, 708, 808, 902). The head electrical connection (184) is adapted to provide a fly height control voltage to the electrode (176, 334, 336, 408, 410, 514, 610, 708, 808, 902).

In addition, a method of fabricating a head (172, 300, 400, 500, 600, 700, 800, 900) for use in controlling fly height with respect to an electrically conductive media surface (170) is provided. The method includes providing a slider body (302) having a leading edge (308, 502, 602, 702, 802), a trailing edge (310, 504, 604, 704, 804) and an air bearing surface (177, 303, 406, 518, 609, 712, 812) defining a bearing surface plane (179, 350). Additionally, the method includes electrically isolating a fly height control electrode (176, 334, 336, 408, 410, 514, 610, 708, 808, 902) from the slider body. Also, an electrical connection (184) is provided to the fly height control electrode (176, 334, 336, 408, 410, 514, 610, 708, 808, 902). The electrical connection (184) is adapted to provide a fly height control voltage to the fly height control electrode (176, 334, 336, 408, 410, 514, 610, 708, 808, 902).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read/write head while maintaining substantially the same functionality without departing from the scope and spirit of the present invention. In addition, although the preferred embodiment described herein is directed to a head for a hard disc drive system, it will be appreciated by those skilled in the art that the teachings of the present invention can be applied to other storage and magnetic systems, like tape drives, without departing from the scope and spirit of the present invention.

What is claimed is:

1. A head for use in accessing data from an electrically conductive media surface, the head comprising:
    a slider body having an air bearing surface defining a bearing surface plane configured to face the media surface;
    a fly height control electrode positioned on the slider body, wherein the fly height control electrode and the media surface are adapted to form opposing plates of a capacitor with a dielectric layer of air supporting the head;
    an insulating layer positioned between the fly height control electrode and the slider body to electrically isolate the fly height control electrode from the slider body; and
    a head electrical connection disposed on the slider body and electrically connected to the fly height control electrode, the head electrical connection adapted to provide a fly height control voltage to the fly height control electrode.

2. The head of claim 1 wherein the fly height control electrode covers an area smaller than the air bearing surface of the slider body.

3. The head of claim 1 and further comprising a ground electrical connection coupled to the head.

4. The head of claim 1 and further comprising a buffer layer positioned on the slider body and between the fly height control electrode and the media surface.

5. The head of claim 1 and further comprising a second fly height control electrode positioned on the slider body and connected to the head electrical connection and electrically isolated from the slider body.

6. The head of claim 5 wherein the head electrical connection is adapted to provide a positive voltage to the first mentioned fly height control electrode and adapted to provide a negative voltage to the second fly height control electrode.

7. The head of claim 1 wherein the slider body comprises a raised center pad, wherein the fly height control electrode is positioned on the center pad.

8. The head of claim 7 and further comprising a second fly height control electrode positioned on the center pad.

9. The head of claim 1 wherein the slider body comprises a side rail, wherein the fly height control electrode is positioned on the side rail.

10. The head of claim 1 wherein the fly height control electrode is displaced from the bearing surface plane in the range of about 0.005 microns to 0.05 microns.

11. The head of claim 1, wherein the fly height control electrode is of substantially the same material as the slider body.

12. A method of fabricating a head for use in controlling fly height with respect to an electrically conductive media surface, the method comprising:

providing an electrically conductive slider body having a leading edge, a trailing edge and an air bearing surface defining a bearing surface plane;

electrically isolating a fly height control electrode from the slider body; and providing an electrical connection to the fly height control electrode, the electrical connection adapted to provide a fly height control voltage to the fly height control electrode.

13. The method of claim 12 and further comprising providing an insulating layer positioned between the fly height control electrode and the slider body.

14. The method of claim 12 and further comprising providing a ground electrical connection coupled to the slider body.

15. The method of claim 12 and further comprising providing a buffer layer positioned on the slider body and between the fly height control electrode and the media surface.

16. The method of claim 12 and further comprising positioning a second fly height control electrode on the slider body and electrically isolating the second fly height control electrode from the slider body.

17. The method of claim 12 and further comprising positioning a raised center pad on the slider body, wherein the fly height control electrode is positioned on the center pad.

18. The method of claim 17 and further comprising positioning a second fly height control electrode on the center pad.

19. The method of claim 12 and further comprising positioning the fly height control electrode displaced from the bearing surface plane in the range of about 0.005 microns to 0.05 microns.

20. The method of claim 12 wherein electrically isolating comprises:

etching a cavity in the trailing edge;

providing an insulating layer in the cavity; and forming an air bearing surface on the slider body.

21. The method of claim 20 wherein electrically isolating further comprises;

filling the cavity with conductive material; and forming the air bearing surface to expose the conductive material.

22. The method of claim 12 wherein electrically isolating comprises:

providing a layer of conductive material to the trailing edge; and positioning a transducer layer between the layer of conductive material and the slider body.

23. The method of claim 22 wherein providing a layer of conductive material comprises providing conductive material to a center portion of the trailing edge.

24. A head fabricated according to the method of claim 12.

25. An apparatus comprising:

an electrically conductive media surface;

a head having a substrate with an air bearing surface shaped to provide a fly height spacing between the head and the media surface;

a fly height control electrode positioned on the air bearing surface to cover an area smaller than the air bearing surface, wherein the fly height control electrode is electrically isolated from the substrate; and means for electrically charging the fly height control electrode with respect to the media surface to adjust the fly height spacing.

26. The apparatus of claim 25 and further comprising a second fly height control electrode on the head and means for electrically charging the second fly height control electrode with respect to the media surface to adjust the fly height spacing.

27. The apparatus of claim 26 and further comprising:

means for applying a positive voltage to the first-mentioned fly height control electrode and a negative voltage to the second fly height control electrode.

28. The apparatus of claim 25 wherein the means for electrically charging include providing an electrical connection to the fly height control electrode.

29. The apparatus of claim 25 wherein the means for electrically charging include providing an electrical connection to the media surface.

30. The apparatus of claim 25 and further comprising a buffer layer positioned on the head and between the fly height control electrode and the media surface.

* * * * *